(12) United States Patent
Aston et al.

(10) Patent No.: US 11,878,819 B2
(45) Date of Patent: Jan. 23, 2024

(54) SATELLITE THERMAL ENCLOSURE

(71) Applicant: The Boeing Company, Chicago, IL (US)

(72) Inventors: Richard W. Aston, Brea, CA (US); Emily Colleen Woods, Redondo Beach, CA (US); Rachel Elizabeth Zilz, Redondo Beach, CA (US); Michael John Langmack, Huntington Beach, CA (US); Nicole Marie Hastings, Hermosa Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/553,628

(22) Filed: Dec. 16, 2021

(65) Prior Publication Data

US 2022/0194635 A1    Jun. 23, 2022

Related U.S. Application Data

(60) Provisional application No. 63/126,535, filed on Dec. 17, 2020.

(51) Int. Cl.
*B64G 1/58* (2006.01)
*B64G 1/00* (2006.01)
*B64G 1/64* (2006.01)

(52) U.S. Cl.
CPC .............. *B64G 1/58* (2013.01); *B64G 1/002* (2013.01); *B64G 1/641* (2013.01)

(58) Field of Classification Search
None
See application file for complete search history.

(56) References Cited

U.S. PATENT DOCUMENTS

| | | | |
|---|---|---|---|
| 3,976,269 | A | 8/1976 | Gupta |
| 5,342,465 | A | 8/1994 | Bronowicki et al. |
| 6,064,352 | A | 5/2000 | Silverman et al. |
| 6,199,801 | B1 | 3/2001 | Wilke et al. |
| 6,206,327 | B1 | 3/2001 | Benedetti et al. |
| 6,207,256 | B1 | 3/2001 | Tashiro |
| 6,290,183 | B1 | 9/2001 | Johnson et al. |
| 6,343,770 | B2 | 2/2002 | Holemans |
| 7,249,756 | B1 | 7/2007 | Wilke et al. |
| 8,393,582 | B1 | 3/2013 | Kutter et al. |

(Continued)

FOREIGN PATENT DOCUMENTS

| | | |
|---|---|---|
| CA | 3023416 A1 | 1/2019 |
| CN | 106694884 A | 5/2017 |

(Continued)

OTHER PUBLICATIONS

European Patent Office, Extended European Search Report regarding European Patent Application No. 21214774.8, dated Apr. 21, 2022, 7 pages.

(Continued)

*Primary Examiner* — Tien Q Dinh
*Assistant Examiner* — Nevena Aleksic
(74) *Attorney, Agent, or Firm* — Kolisch Hartwell, P.C.

(57) ABSTRACT

A satellite assembly is disclosed, including a satellite and a shroud. The satellite is stowed in a launch vehicle and the shroud includes a frame supporting a flexible thermal blanket enclosing the satellite.

20 Claims, 13 Drawing Sheets

(56) References Cited

U.S. PATENT DOCUMENTS

| | | | |
|---|---|---|---|
| 8,458,976 B2* | 6/2013 | Chen | B64G 1/58 |
| | | | 52/404.1 |
| 8,550,408 B2 | 10/2013 | Ross et al. | |
| 8,973,873 B2 | 3/2015 | Aston et al. | |
| 9,027,889 B2 | 5/2015 | Aston et al. | |
| 9,475,594 B2 | 10/2016 | Barber et al. | |
| 9,718,566 B2* | 8/2017 | Field | B64G 1/641 |
| 9,796,486 B1 | 10/2017 | Ilsley et al. | |
| 9,828,117 B2 | 11/2017 | Echelman et al. | |
| 10,392,135 B2 | 8/2019 | Smith et al. | |
| 10,407,189 B1 | 9/2019 | Freestone et al. | |
| 10,494,123 B2 | 12/2019 | Aston et al. | |
| 10,518,912 B2 | 12/2019 | Arulf et al. | |
| 10,536,107 B1 | 1/2020 | Ning et al. | |
| 10,538,347 B1 | 1/2020 | Turner et al. | |
| 10,556,710 B2 | 2/2020 | Lancho Doncel | |
| 10,895,015 B1 | 1/2021 | Schaedler et al. | |
| 2004/0074206 A1 | 4/2004 | Tanase et al. | |
| 2006/0107611 A1* | 5/2006 | Merrifield | B64G 99/00 |
| | | | 52/646 |
| 2006/0185277 A1 | 8/2006 | Quincieu | |
| 2007/0068080 A1* | 3/2007 | Vigdorovich | B23Q 11/0891 |
| | | | 49/130 |
| 2011/0120080 A1 | 5/2011 | Schwark, Jr. et al. | |
| 2011/0296675 A1 | 12/2011 | Roopnarine et al. | |
| 2012/0112010 A1 | 5/2012 | Young et al. | |
| 2012/0261515 A1 | 10/2012 | Smith et al. | |
| 2013/0000247 A1 | 1/2013 | Sypeck | |
| 2014/0041231 A1 | 2/2014 | Andrews | |
| 2014/0065433 A1 | 3/2014 | Lau et al. | |
| 2014/0131521 A1* | 5/2014 | Apland | B64G 1/641 |
| | | | 244/173.3 |
| 2014/0239125 A1 | 8/2014 | Aston et al. | |
| 2015/0048209 A1 | 2/2015 | Hoyt et al. | |
| 2015/0175210 A1 | 6/2015 | Raymond | |
| 2015/0298423 A1 | 10/2015 | Holemans | |
| 2016/0031572 A1* | 2/2016 | Dube | B64G 1/641 |
| | | | 244/173.1 |
| 2016/0237836 A1 | 8/2016 | Harris | |
| 2016/0282067 A1 | 9/2016 | Aston et al. | |
| 2016/0288926 A1 | 10/2016 | Smith et al. | |
| 2016/0325520 A1 | 11/2016 | Berger | |
| 2016/0340061 A1 | 11/2016 | Bose et al. | |
| 2017/0036783 A1 | 2/2017 | Snyder | |
| 2018/0106564 A1 | 4/2018 | Isaacs et al. | |
| 2018/0194096 A1 | 7/2018 | Martial Somda et al. | |
| 2018/0194494 A1 | 7/2018 | Dube | |
| 2018/0223947 A1 | 8/2018 | Shepard et al. | |
| 2018/0229443 A1 | 8/2018 | Pham et al. | |
| 2018/0251238 A1 | 9/2018 | Cherrette | |
| 2018/0251241 A1 | 9/2018 | Burt | |
| 2018/0281339 A1 | 10/2018 | Hull et al. | |
| 2019/0023423 A1 | 1/2019 | Grubler et al. | |
| 2019/0202163 A1 | 7/2019 | Yeh et al. | |
| 2019/0315501 A1 | 10/2019 | Duong et al. | |
| 2019/0337220 A1 | 11/2019 | Beyerle et al. | |
| 2020/0010220 A1 | 1/2020 | Fraze | |
| 2021/0061495 A1 | 3/2021 | Aston et al. | |
| 2021/0221540 A1 | 7/2021 | Panetti et al. | |
| 2021/0354856 A1 | 11/2021 | Aston et al. | |
| 2021/0354859 A1 | 11/2021 | Aston et al. | |
| 2021/0356015 A1 | 11/2021 | Aston et al. | |
| 2022/0063845 A1* | 3/2022 | Kline | B64G 1/46 |

FOREIGN PATENT DOCUMENTS

| | | |
|---|---|---|
| CN | 208392799 U | 1/2019 |
| CN | 109317677 A | 2/2019 |
| CN | 111532452 A | 8/2020 |
| EP | 0780294 A1 | 6/1997 |
| EP | 3034208 A1 | 6/2016 |
| EP | 3333474 A1 | 10/2017 |
| EP | 3569396 A1 | 11/2019 |
| EP | 3785828 A1 | 3/2021 |
| WO | 2017169080 A1 | 10/2017 |

OTHER PUBLICATIONS

European Patent Office, Extended European Search Report regarding European Patent Application No. 21214809.2, dated Apr. 25, 2022, 9 pages.

Zhang, Xiaoyu et al. "Vibration tests of 3D printed satellite structure made of lattice sandwich panels." AIAA Journal 56.10 (Oct. 1, 2018): 4213-4217.

European Patent Office, Extended European Search Report regarding European Patent Application No. 20189687.5, dated Feb. 1, 2021, 11 pages.

Morrett, Robert, Sep. 10, 2015, "Selecting a filler metal: Seven factors to consider", Plant Engineering. https://www.plantengineering.com/articles/selecting-a-filler-metal-seven-factors-to-consider/ (Year: 2015).

U.S. Patent and Trademark Office, Final Office Action regarding U.S. Appl. No. 16/554,150, dated May 31, 2022, 19 pages.

U.S. Patent and Trademark Office, Non-Final Office Action regarding U.S. Appl. No. 16/554,150, dated Oct. 4, 2022, 27 pages.

U.S. Patent and Trademark Office, Non-Final Office Action regarding U.S. Appl. No. 16/877,477, dated Apr. 14, 2022, 31 pages.

Planetary Systems Corporation, "2000785G MkII MLB User Manual," Jul. 24, 2018, 94 pages, Planetary Systems Corporation, Silver Spring, Maryland.

European Patent Office, Extended European Search Report regarding European Patent Application No. 21168773.6, dated Oct. 19, 2021, 9 pages.

European Patent Office, Extended European Search Report regarding European Patent Application No. 21168768.6, dated Oct. 19, 2021, 11 pages.

Mauduit et al., Study of the Suitability of Aluminum Alloys for Additive Manufacturing by Laser Powder Bed Fusion, U.P.B. Sci. Bull., Series B. vol. 79, Iss. 4, 2017, 22 pages.

U.S. Patent and Trademark Office, Non-Final Office Action regarding U.S. Appl. No. 16/877,474, dated Sep. 7, 2022, 49 pages.

U.S. Patent and Trademark Office, Non-Final Office Action regarding U.S. Appl. No. 16/877,480, dated Feb. 10, 2023, 49 pages.

U.S. Patent and Trademark Office, Final Office Action regarding U.S. Appl. No. 16/877,474, dated Mar. 15, 2023, 20 pages.

U.S. Patent and Trademark Office, Final Office Action regarding U.S. Appl. No. 16/554,150, dated Mar. 27, 2023, 19 pages.

European Patent Office, Examination Report regarding European Patent Application No. 21168768.6, dated Mar. 28, 2023, 7 pages.

U.S. Patent and Trademark Office, Non-Final Office Action regarding U.S. Appl. No. 17/553,593 dated May 25, 2023, 56 pages.

\* cited by examiner

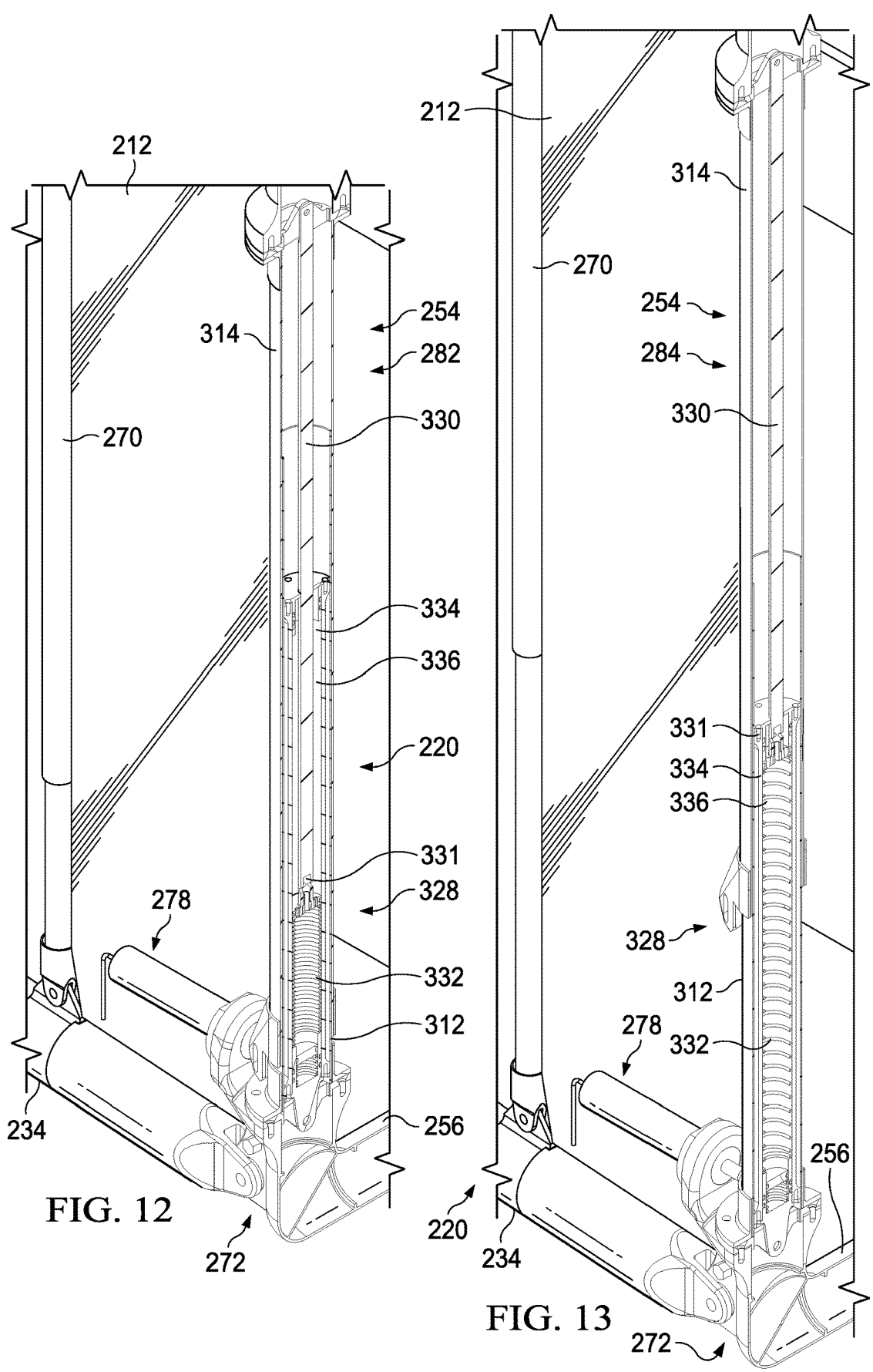

SATELLITE THERMAL ENCLOSURE

CROSS-REFERENCES

This application claims the benefit under 35 U.S.C. § 119(e) of the priority of U.S. Provisional Patent Application Ser. No. 63/126,535, filed Dec. 17, 2020, the entirety of which is hereby incorporated by reference for all purposes.

BACKGROUND

Spacecraft must withstand extreme temperatures, beginning with the intense thermal conditions of launch. Typically, launch vehicles include a payload fairing to protect a transported payload such as a satellite from dynamic pressure and aerodynamic heating during launch. Heavy and bulky fairings can restrict the space and weight available for the payload, and in some cases the payload may need to withstand bending loads or vibrations from a connected fairing. A need exists for low-weight and low-profile thermal protection.

SUMMARY

The present disclosure provides systems, apparatus, and methods relating to thermal enclosures for satellites. In some examples, a satellite assembly may include a satellite and a shroud. The satellite may be stowed in a launch vehicle and the shroud may include a frame supporting a flexible thermal blanket enclosing the satellite.

In some examples, an apparatus for transporting a satellite to space may include a launch vehicle and a thermal shroud. The shroud may include a frame and a flexible material supported by the frame. The shroud may also be connected to the launch vehicle and configured for housing a satellite during a launch phase.

In some examples, an assembly for transporting satellites to space may include a ring structure and a plurality of shrouds extending radially outward from the ring structure. The ring structure may have a central axis parallel to a launch direction. Each shroud may include a frame supporting a flexible wall material. Each shroud may also have a proximal end connected to the ring structure and a distal end including a door that permits deployment of a satellite into space.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 12 is a cross-sectional detail view of a vertical strut of the frame of the thermal shroud of FIG. 3, in a stowed position.

FIG. 13 is a cross-sectional detail view of the vertical strut of FIG. 12, in a deployed position.

DETAILED DESCRIPTION

Figure 1:
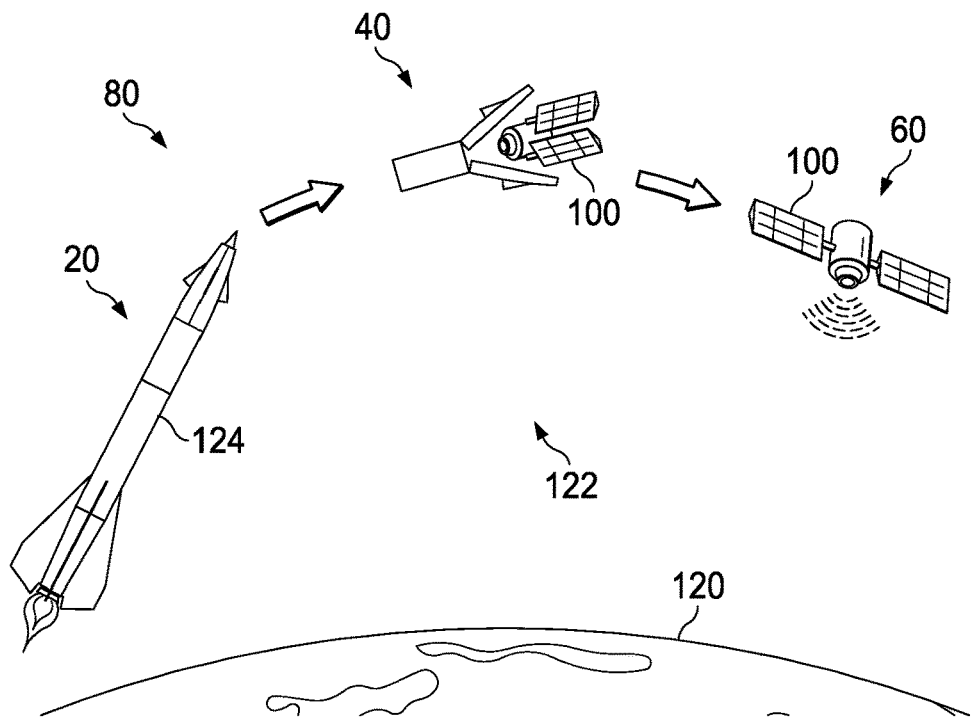
FIG. 1 is schematic diagram of an illustrative satellite being launched and deployed from a launch vehicle.

Various aspects and examples of a thermal enclosure having an expandable frame, as well as related methods, are described below and illustrated in the associated drawings. Unless otherwise specified, a thermal enclosure in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, an expandable thermal enclosure in accordance with the present teachings may include a frame supporting a flexible thermally insulating material. The shroud may be configured to house one or more satellites, and thermally protect the satellites during launch. The shroud may include a door to cover an opening framed by a top frame element, a bottom frame element, and two side frame elements. The frame elements may also be described as a top strut, a bottom strut, and opposing side struts. The door may open to permit deployment of the one or more satellites.

The shroud may have two or more trapezoidal sides and two or more expandable sides, which expand from rectangular to trapezoidal. The shroud may also have a proximal end portion and a distal end portion, the distal end portion including the opening and the door. The distal end portion may be expandable from a stowed configuration to a deployed configuration. The two side frame elements may be capable of telescoping between a stowed position and a deployed position, to expand the size of the opening. Each side frame element may include a passive actuator such as a spring to urge expansion of the distal end portion. The door may include opposing frame members, each frame member being capable of telescoping in parallel with the pair of side frame elements.

At least one of the top and bottom frame elements may engage the one or more housed satellites in the stowed configuration, to constrain lateral movement of the distal end portion of the shroud. When the shroud expands to the deployed configuration, the lateral constraint may be released.

Examples, Components, and Alternatives

The following sections describe selected aspects of exemplary thermal enclosures as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Satellite and Associated Method

Figure 2:
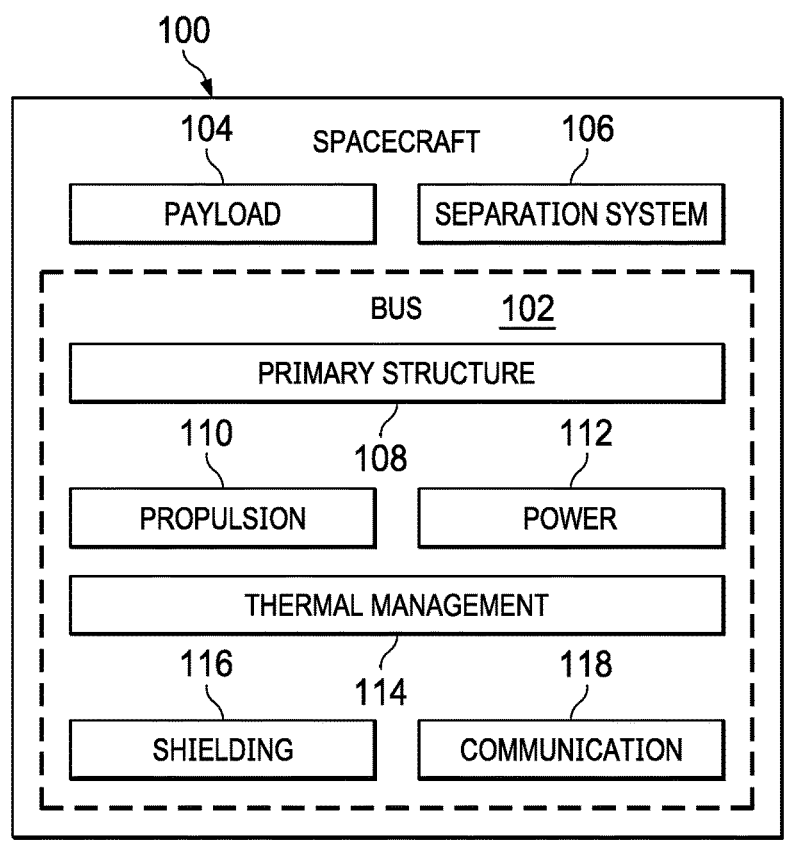
FIG. 2 is a block diagram of the satellite of FIG. 1.

Examples disclosed herein may be described in the context of an illustrative satellite launch method 80 (see FIG. 1) and an illustrative satellite 100 (see FIG. 2). In the present example, method 80 includes three phases, launch phase 20, deployment phase 40, and operation phase 60. Launch phase 20 may include transporting satellite 100 (alternatively, spacecraft 100) from a planetary body 120 such as Earth to outer space 122, using a launch vehicle 124. In the context of Earth, outer space may comprise a region beyond the Karman line. Deployment phase 40 may include separating satellite 100 from launch vehicle 124, once a desired location, trajectory and/or orbit has been achieved. Operation phase 60 may include preparation of satellite 100 for operation, such as establishing communication with a controller on planetary body 120, extending solar panels or instrument arms, and/or maneuvering to a desired orientation relative to the planetary body. In some examples, the method may further include design, production, and/or in-service phases.

Each of the processes of method 80 may be performed or carried out by a system integrator, a third party, and/or an operator (e.g., a customer). For the purposes of this description, a system integrator may include, without limitation, any number of aerospace manufacturers and major-system subcontractors; a third party may include, without limitation, any number of vendors, subcontractors, and suppliers; and an operator may be a telecommunications company, leasing company, military entity, service organization, and so on.

As shown in FIG. 2, satellite 100 may include a bus 102 with a plurality of satellite systems, a payload 104 and a separation system 106. Examples of the plurality of systems include one or more of a primary structure 108, a propulsion system 110, an electrical power system 112, a thermal management system 114, a radiation shielding system 116, and a communication system 118. Each system may comprise various subsystems, such as controllers, processors, actuators, effectors, motors, generators, etc., depending on the functionality involved. Any number of other systems may be included. Although an unmanned artificial satellite example is shown, the principles disclosed herein may be applied to other aerospace vehicles and technology, such as a launch vehicle, space station, crewed spacecraft, and/or interstellar probe.

Apparatuses and methods shown or described herein may be employed during any one or more of the stages of the satellite launch method 80. For example, a thermal enclosure may protect enclosed satellite 100 from thermal conditions during launch phase 20. Also, one or more examples of the apparatuses, methods, or combinations thereof may be utilized during deployment phase 40 for example, by expanding and/or opening a thermal enclosure to provide clearance for the satellite to be deployed. Similarly, one or more examples of the apparatus or method realizations, or a combination thereof, may be utilized, for example and without limitation, while satellite 100 is in operation phase 60, to return a thermal enclosure to a closed and/or stowed configuration.

B. Illustrative Thermal Enclosure

Figure 3:
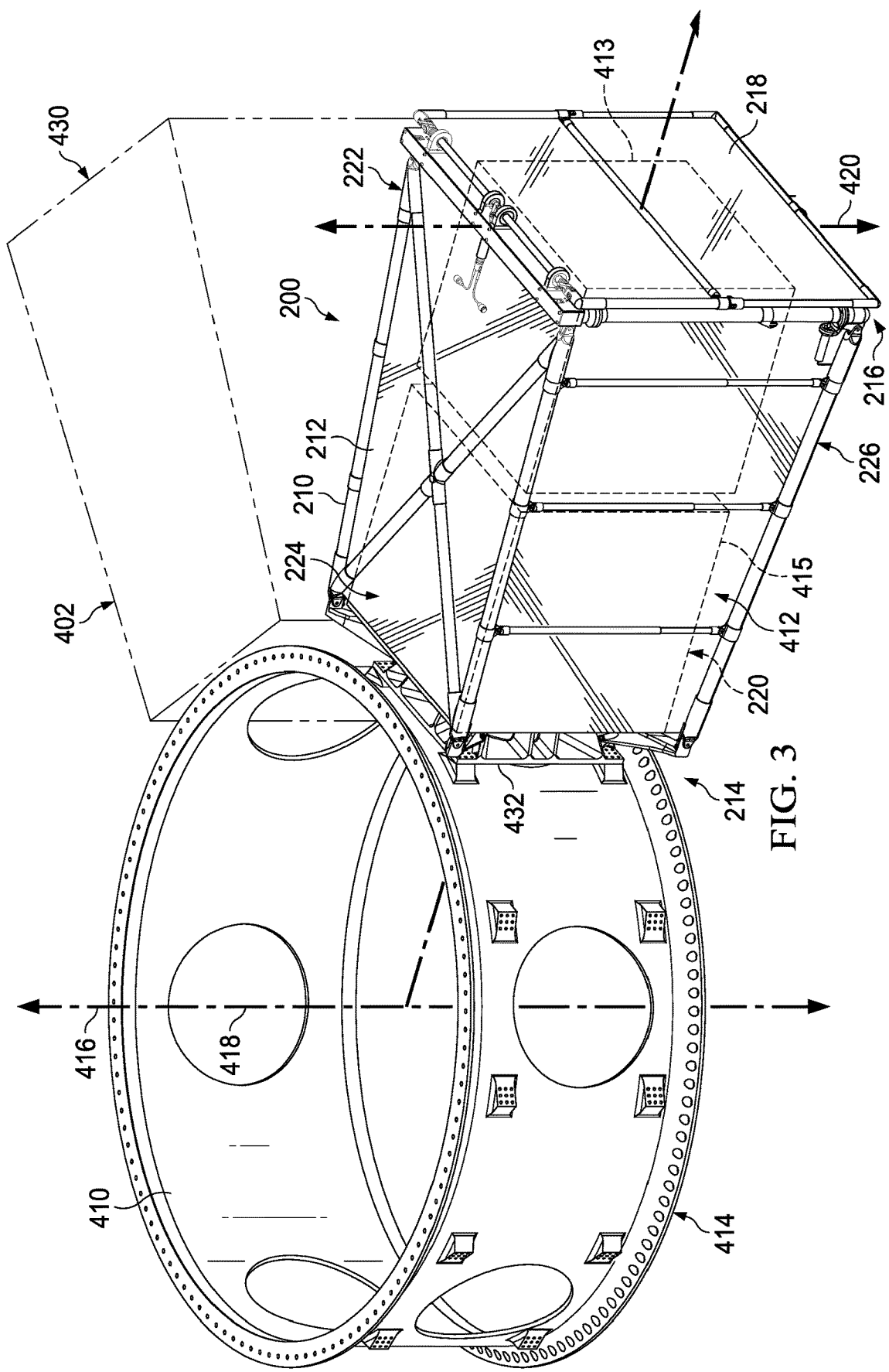
FIG. 3 is an isometric view of an illustrative thermal shroud in accordance with aspects of the present disclosure, mounted to a launch vehicle payload adaptor and enclosing a satellite assembly.

As shown in FIGS. 3-14, this section describes an illustrative thermal shroud 200. Thermal shroud 200 is an example of an expandable thermal enclosure, as described above. The thermal shroud may be used in a launch vehicle, to enclose and protect a payload. In FIG. 3, thermal shroud 200 is depicted mounted to a launch vehicle payload adaptor 410 and enclosing a pair of stacked satellites 412, as part of a satellite assembly 402. The pair of satellites may also be described as a satellite stack and/or a plurality of satellites.

Satellite stack 412 includes a distal satellite 413 and a proximal satellite 415, and is connected to a payload adaptor 410 by a mounting plate 432. Thermal shroud 200 is connected to payload adaptor 410 through mounting plate 432, and may be described as supported by the satellite stack.

In the present example, payload adaptor 410 is a ring structure such as the Evolved Secondary Payload Adapter (ESPA) produced by Moog, Inc. Payload adaptor 410 includes six mounting points 414, arranged symmetrically around the ring structure. In FIG. 3, a plurality of shrouds 430 including shroud 200 are shown connected to mounting plates at two mounting points 414. In many examples, thermal shrouds, satellites, and/or other payload equipment may be mounted symmetrically about payload adaptor 410 in order to balance loads transferred to the payload adaptor.

Payload adaptor 410 is part of a launch vehicle such as launch vehicle 124 described above, having a launch axis 416. The launch vehicle may also be described as part of satellite assembly 402. In the present example, the ring structure of payload adaptor 410 has a central axis 418 parallel to launch axis 416. The launch axis may also be described as a launch direction, as a longitudinal axis of the launch vehicle, as a z-axis, or as a vertical axis. Directions perpendicular to the launch axis may be described as lateral, longitudinal, and/or horizontal.

Prior to launch, the launch axis may be aligned with a vertical direction as defined by a gravitational frame of reference. During launch, the launch axis may rotate relative to the gravitational frame of reference as the vehicle follows a non-linear launch trajectory. Therefore, for clarity in the following description, directional terms and descriptors such as "up", "down", "top", "bottom", and the like should be understood relative to a vertical direction as defined by the launch axis.

Referring again to FIG. 3, thermal shroud 200 includes a rigid frame 210 and a flexible wall material 212. The shroud is connected to mounting plate 432 at a proximal end 214. At a distal end 216, the shroud includes a door 218. The thermal shroud is expandable to allow maximum volume for satellites 412 in the launch vehicle but provide sufficient clearance for the satellites to be safely deployed. The expandable shroud may allow greater volume for the satellites than using separate thermal protection and dynamic clearance.

Thermal shroud 200 may be configured according to the constraints of the selected launch vehicle, payload adaptor, and other payload or operational equipment housed in the launch vehicle. More specifically, the thermal shroud may be expandable in a direction or directions for which a constraint is removed or relaxed in the process of payload deployment. The thermal shroud may expand an opening or openings to permit clear passage of deployed satellites.

In the present example, payload adaptor 410 is a secondary payload adaptor and a primary payload may be mounted vertically above thermal shroud 200. Therefore, a vertical extent of the shroud may be constrained during launch, but vertical clearance may become available after deployment of the primary payload. Accordingly, thermal shroud 200 has a vertical direction of expansion 420. A lateral extent of the shroud is not constrained, so the shroud does not expand laterally. In the present example, satellites 412 are configured to deploy radially outward from payload adaptor 410, so door 218 is disposed at distal end 216 of thermal shroud 200, and the distal end of the shroud expands.

Figure 5:
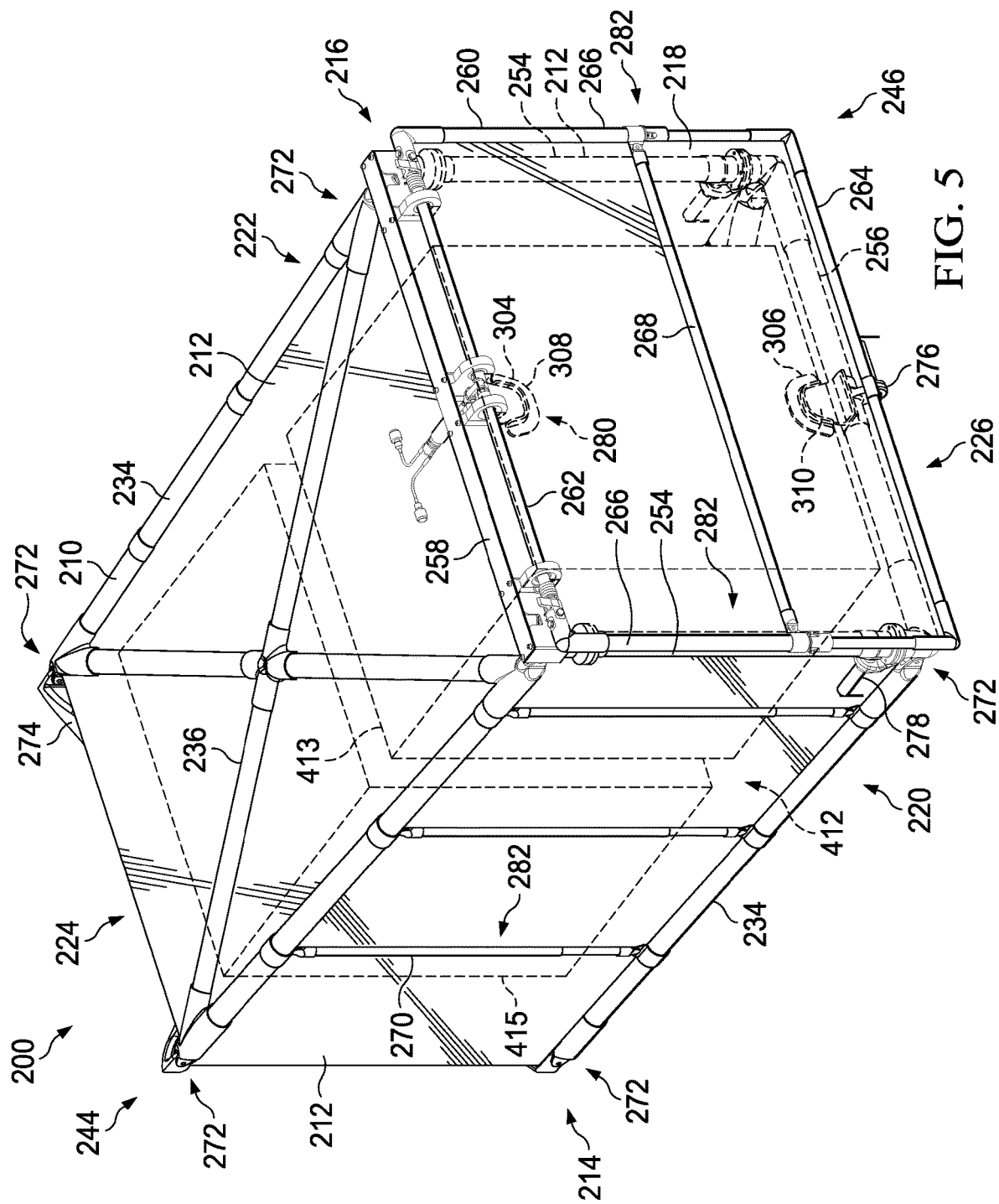
FIG. 5 is an isometric view of the thermal shroud and satellite assembly of FIG. 3 in a stowed position.
Figure 6:
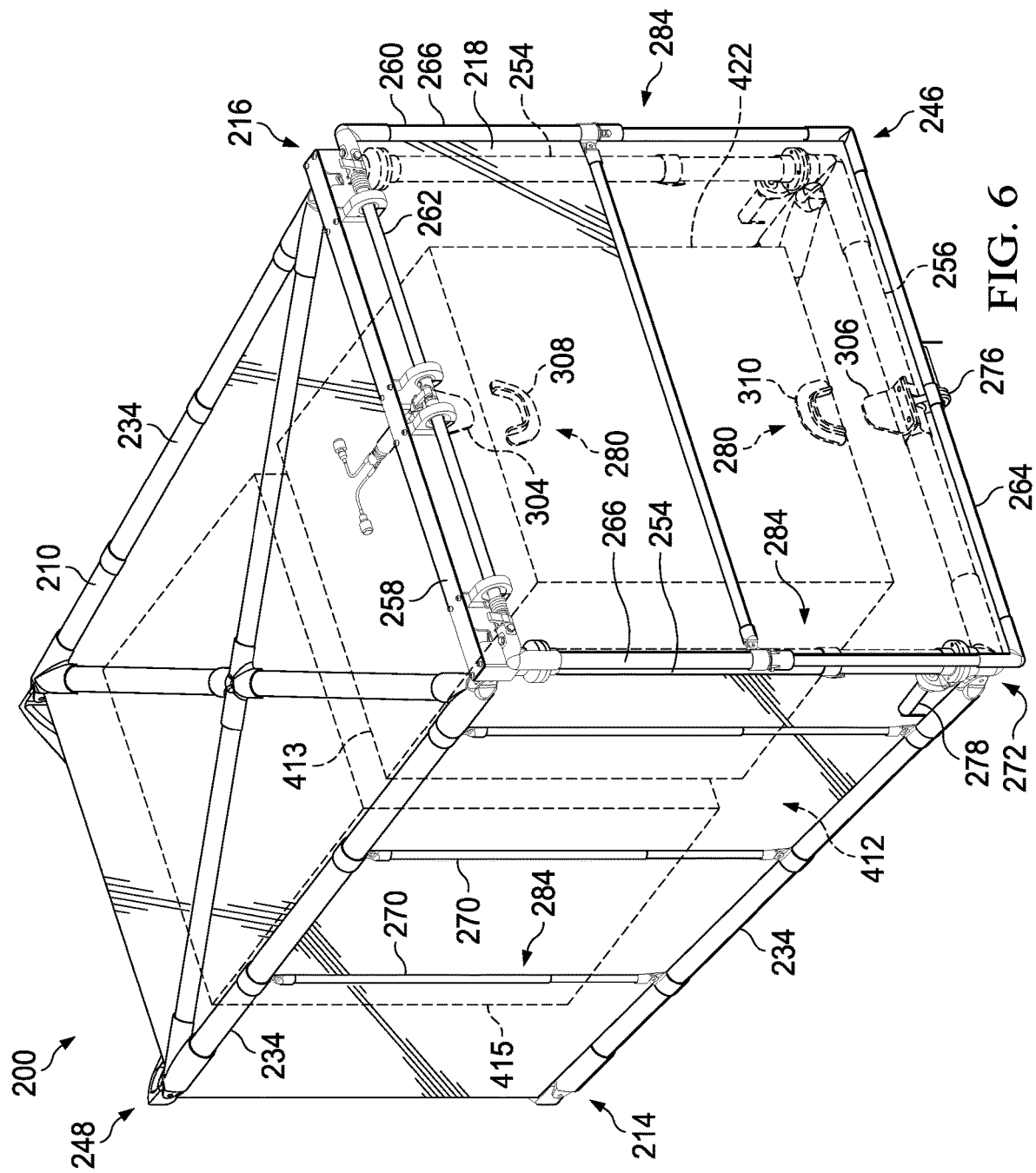
FIG. 6 is an isometric view of the thermal shroud and satellite assembly of FIG. 3 in a deployed position, with the door in a closed position.
Figure 7:
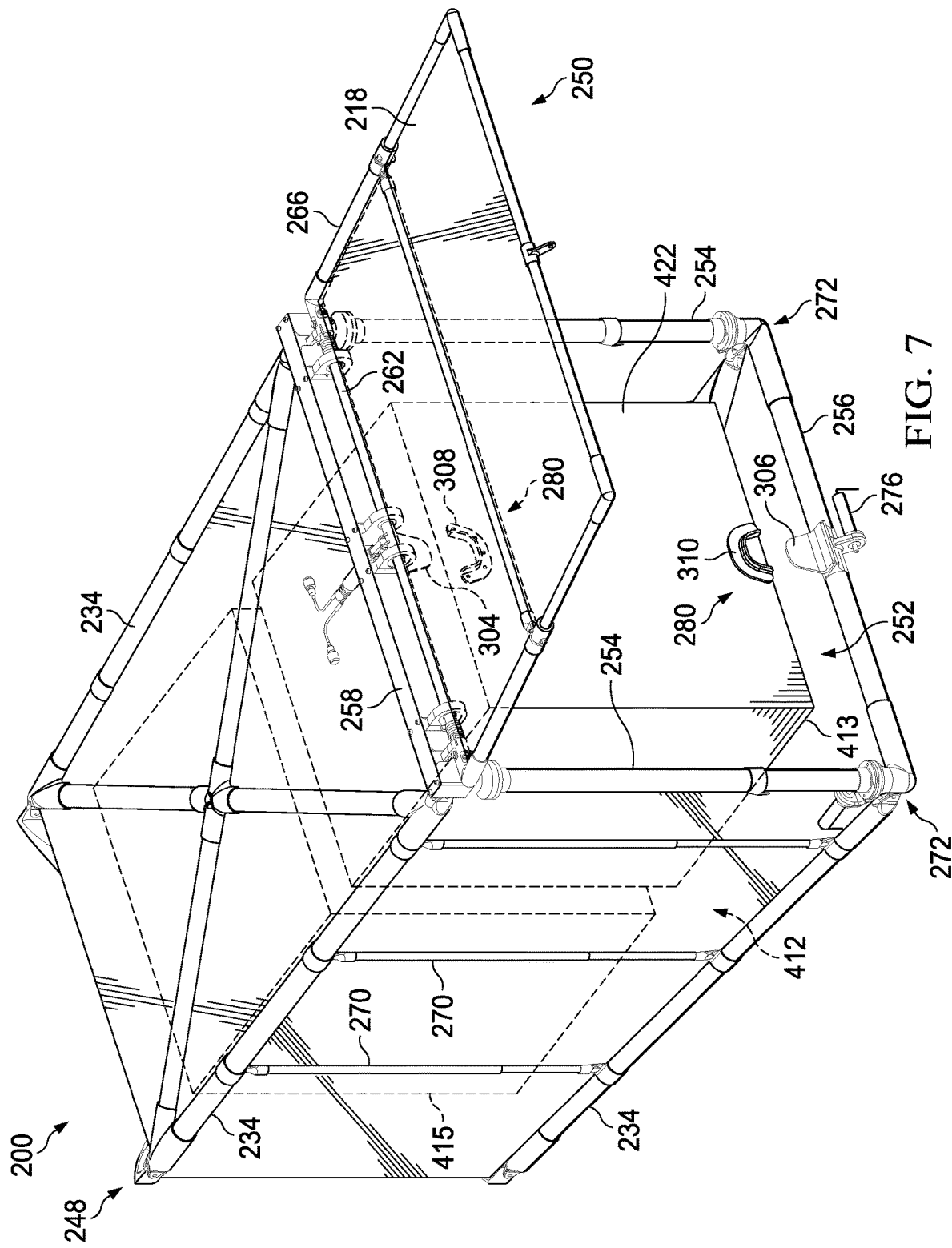
FIG. 7 is an isometric view of the thermal shroud and satellite assembly of FIG. 3 in a deployed position, with the door in an open position.

Thermal shroud 200 may be stowed during launch, as shown in FIG. 5. When satellites 412 are to be deployed, distal end 216 may expand vertically, as shown in FIGS. 3 and 6. Door 218 may open, as shown in FIG. 7. A left side 220 and a right side 222 of the shroud may transition from a rectangular shape to a trapezoidal shape as the shroud expands. Door 218 may transition from a rectangular to a square shape. A top side 224 and a bottom side 226 of thermal shroud 200 may be unaffected by the expansion, and remain trapezoidal.

The specific shapes of the shroud sides may depend on the size and shape of the enclosed satellites. In the depicted example, the shroud is configured for two cuboid satellites. In general, when thermal shroud 200 expands, top and bottom sides 224, 226 and proximal end 214 may maintain a constant area, while each of left and right sides 220, 222 and distal end 216 expand. Such expansion may allow maximum volume for satellites 412, while limiting the complexity and number of moving parts needed for thermal shroud 200.

Figure 4:
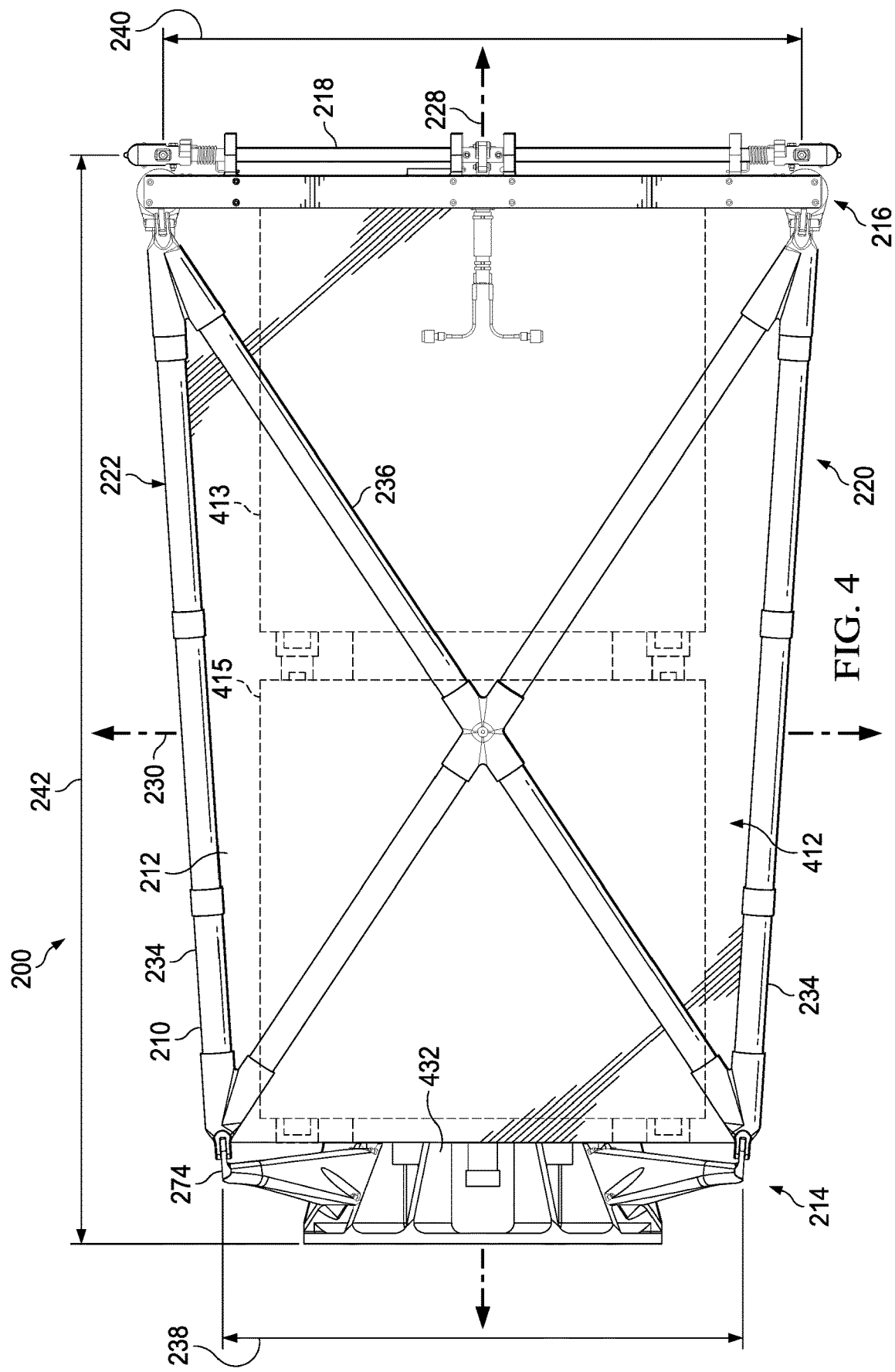
FIG. 4 is a top view of the thermal shroud and satellite assembly of FIG. 3.

FIG. 4 is a view parallel the vertical axis, of top side 224 of thermal shroud 200 and of satellite stack 412. The shroud may be described as having a longitudinal axis 228 and a lateral axis 230. Longitudinal axis 228 may also be described as a long axis of thermal shroud 200. Left side 220 and right side 222 are opposing along the lateral axis, and may be described as lateral sides. Mounting plate 432 opposes door 218 along the longitudinal axis.

Proximal end 214 of thermal shroud 200 includes four base arms 274, which connect the shroud to mounting plate 432. In the present example, the base arms are bolted to four corners of the mounting plate. Mounting plate 432 includes an outer face configured to connect the satellite stack and the shroud to the payload adaptor.

An inner face of mounting plate 432 is configured to be connected to satellites 413, 415 by a separation system. Mounting plate 432 may form part of the load path of both the satellites and the shroud to the launch vehicle, and may be engineered to withstand any resulting bending moment and/or vibrational loading. For example, the mounting plate may be manufactured from the same material as the primary structure of the satellites and/or the payload adaptor, such as an aluminum alloy.

In addition to base arms 274, frame 210 may include a combination of composite tubes and additively manufactured brackets, sleeves, and other connecting components. The hollow composite tubes may be light-weight but sufficiently strong to support the weight of the frame and attached flexible wall material 212. The connecting components may be additively manufactured out of any appropriately strong and lightweight material, such as a plastic or aluminum alloy. Additive manufacture may allow inexpensive production of custom components that enable pivoting or other motion associated with the expansion of the thermal shroud, and/or integration of functional components such as latches.

Flexible wall material 212 may include any lightweight and sufficiently thermally insulating material that can be folded, pleated, or otherwise stowed. For example, the material may include a thermal blanket or space blanket. More specifically, the material may include a foil coated plastic sheet or film. In the present example, the flexible wall material includes a single layer of thermal blanket. In some examples, the flexible wall material may include multiple layers and/or a combination of multiple insulating materials.

Flexible wall material 212 may be bonded and/or otherwise adhered to frame 210 along some or all of the material's edges. On top side 224 and bottom side 226, the flexible wall material may be stretched or extended flat between longitudinal struts 234 of frame 210. The flexible wall material may extend under a cross-brace 236. On left side 220 and right side 222, the flexible wall material may be pleated or folded to include additional material. The flexible wall material may unfold as the left and right sides of thermal shroud 200 expand.

As noted above, top side 224 is trapezoidal in shape to provide good lateral clearance for deployment of satellites 412. The top side may be described as having a proximal width 238 and a distal width 240 between longitudinal struts 234, as measured parallel to lateral axis 230. The distal width may be greater than the proximal width by twice a selected lateral clearance for satellite deployment. Thermal shroud 200 may be described as having a length 242 between base arms 274 and door 218, as measured parallel to longitudinal axis 228. Length 242 may be the same for every side 220, 222, 224, 226.

Proximal width 238 and length 242 may depend on the size and geometry of satellites 412. That is, the shroud may be sized to closely conform to the dimensions of the enclosed satellite or satellites. For example, thermal shroud 200 may be configured to enclose a single satellite, in which case length 242 may be half as much as in the depicted example but proximal width 238 and distal width 240 may be the same as in the depicted example. Material, size, number and/or position of the composite tubes making up frame 210 may similarly be altered according to the shroud size and/or design, to minimize weight but maintain structural strength.

FIG. 5 is an isometric view of thermal shroud 200 in a stowed position 244, with door 218 in a closed position 246. In FIG. 6, the shroud is depicted in a deployed position 248, with the door still in the closed position. In FIG. 7, thermal shroud 200 is depicted in the deployed position, with door 218 in an open position 250.

As shown in FIGS. 5-7, frame 210 includes four longitudinal struts 234, extending from base arms 274 to an opening 252. The opening is defined between two vertical struts 254, a lower lateral strut 256, and an upper lateral bar 258. Vertical struts 254 may also be described as side frame elements, lower lateral strut 256 as a bottom frame element, and upper lateral bar 258 as a top frame element. Opening 252 may also be described as framed by the vertical struts, lower lateral strut, and upper lateral bar. Door 218 includes a frame 260 and pleated or folded flexible wall material 212. The door frame is made up of a hinge rod 262 connected to a latch rod 264 by two side struts 266. A brace rod 268 extends laterally between the side struts and may restrain flexible wall material 212, controlling any tendency of the material to billow.

Top side 224 of thermal shroud 200 includes cross-brace 236 and flexible wall material 212, extending between an upper two of longitudinal struts 234. Similarly to brace rod 268, cross-brace 236 may restrain flexible wall material 212 and control any tendency of the material to billow. The cross-brace 236 may also provide structural reinforcement to frame 210. Bottom side 226, indicated but not depicted, similarly includes a cross-brace and flexible wall material between a lower two of longitudinal struts 234.

Lateral sides 220, 222 each include pleated or folded flexible wall material 212 and three vertical telescoping rods 270 extending between an upper longitudinal strut 234 and a lower longitudinal strut 234. Similarly to brace rod 268 and cross-brace 236, the vertical telescoping rods may restrain flexible wall material 212, controlling any tendency of the material to billow, particularly during expansion of the lateral sides and unfolding of the flexible wall material.

Each of longitudinal struts 234 is connected at a proximal and a distal end by a pivotable corner bracket 272. At the proximal end, a bracket pivotably connects the longitudinal strut to a base arm 274. At the distal end a bracket pivotably connects the longitudinal strut to either upper lateral bar 258 or lower lateral strut 256, at a corner of the frame of opening 252. Pivotable corner brackets 272 are further described with reference to FIG. 11, below.

Thermal shroud 200 further includes three latches and a restraint system. A door latch 276 connects latch rod 264 of door 218 to lower lateral strut 256, as further described with reference to FIG. 10, below. Each vertical strut 254 is connected to a lower one of longitudinal struts 234 by an expansion latch 278, as described further with reference to FIG. 11, below. Upper lateral bar 258 and lower lateral strut 256 are constrained relative to satellites 412 by a restraint system 280 including two engaging tab structures, as described further with reference to FIGS. 9 and 10, below.

In some examples, thermal shroud 200 may include additional struts, rods, or bars as necessary to achieve desired structural properties of frame 210. In some examples, the shroud may omit one or more of the structural members described in the present example. For instance, one or both lateral sides may include an additional longitudinal strut, or only one vertical telescoping rod may be included. Latches, tabs, brackets and/or other connecting structures may be included, omitted, and/or otherwise positioned to facilitate expansion of the shroud and opening of door 218.

Referring again to FIG. 5, opening 252 is covered by door 218 in closed position 246, obstructing exit of satellites 412 and thermally insulating the opening. Frame 260 of the door is oriented such that side struts 266 are both proximate and parallel to vertical struts 254, and latch rod 264 is both proximate and parallel to lower lateral strut 256. Brace rod 268 and flexible wall material 212 extend across opening 252.

Vertical struts 254, side struts 266, and vertical telescoping rods 270 are all collapsed when thermal shroud 200 is in stowed position 244. The vertical struts, side struts, and vertical telescoping rods may be described as each having a collapsed position 282. Lateral sides 220, 222, opening 252, and door 218 are all rectangular. Expansion latches 278 are both engaged, and the tab structures of restraint system 280 are engaged with satellites 412. Thermal shroud 200 also occupies the least volume when in the stowed position.

Thermal shroud 200 may be placed in stowed position 244 by an operator such as a payload specialist when satellites 412 have been fully mounted and connected inside the thermal shroud. The shroud may remain in the stowed position throughout launch, until satellites 412 are ready to be deployed. At that point, expansion latches 278 may be released, triggering expansion of vertical struts 254, as described further with reference to FIGS. 12 and 13, below.

Turning to FIG. 6, thermal shroud 200 is shown in deployed position 284. Door 218 is still in closed position 246. Vertical struts 254 have fully expanded, driving corresponding expansion of side struts 266 and vertical telescoping rods 270. The vertical struts, side struts, and vertical telescoping rods may be described as each having an expanded position 284. The length of vertical telescoping rods differs in expanded positions 284. In other words, the distance by which the rods expand increases from proximal end 214 to distal end 216 as the distal end expands to form the trapezoidal shape of the expanded lateral sides. Vertical struts 254 expand a greater distance than any of vertical telescoping rods 270, and side struts 266 expand the same distance as the vertical struts.

In deployed position 248, opening 252 and door 218 have a square shape. Side struts 266 of door 218 lock in expanded position 284, as described further with reference to FIG. 14, below. Corner brackets 272 pivot from the stowed position to deployed position 248 to accommodate the change in angle between longitudinal struts 234 and base plate arms 274, upper lateral bar 258, or lower lateral strut 256. Expansion of vertical struts 254 moves upper lateral bar 258 and lower lateral strut 256 away from satellites 412, thereby disengaging restraint system 280 from the satellites.

Once thermal shroud 200 has fully expanded to deployed position 248, door latch 276 is released to allow door 218 to open. The thermal shroud may remain in the deployed position with door 218 in closed position 246 only briefly prior to deployment of an outer-most or distal satellite 413 of satellites 412. In some examples, for instance if an inner-most or proximal satellite 415 of the satellites is to be deployed in a substantially different orbit than the distal satellite, the door may be re-closed after deploying the distal satellite and thermal shroud 200 may remain in deployed position 248 with the door in closed position 246 until the proximal satellite is ready for deployment.

In the present example, thermal shroud 200 is only manually re-stowable from deployed position 248 to stowed position 244. In other words, the thermal shroud may not be remotely or automatically collapsed back to the stowed position after launch. In some examples, vertical struts 254 and/or another element or elements of frame 210 may include a motorized actuator to allow remote collapse of the shroud.

As shown in FIG. 7, door 218 rotates about hinge rod 262 to open position 250. In the present example, the door rotates through 100 degrees to ensure that the opened door does not impede satellite deployment. In general, the door may rotate at least 90 degrees and preferably more than 90 degrees. Once door 218 is fully opened to open position 250, a separation system of distal satellite 413 may be actuated to urge the satellite out of opening 252, in a direction parallel to the longitudinal axis of thermal shroud 200. As noted above, proximal satellite 415 may be deployed next, or door 218 may be closed and re-opened for deployment of the proximal satellite.

Figure 8:
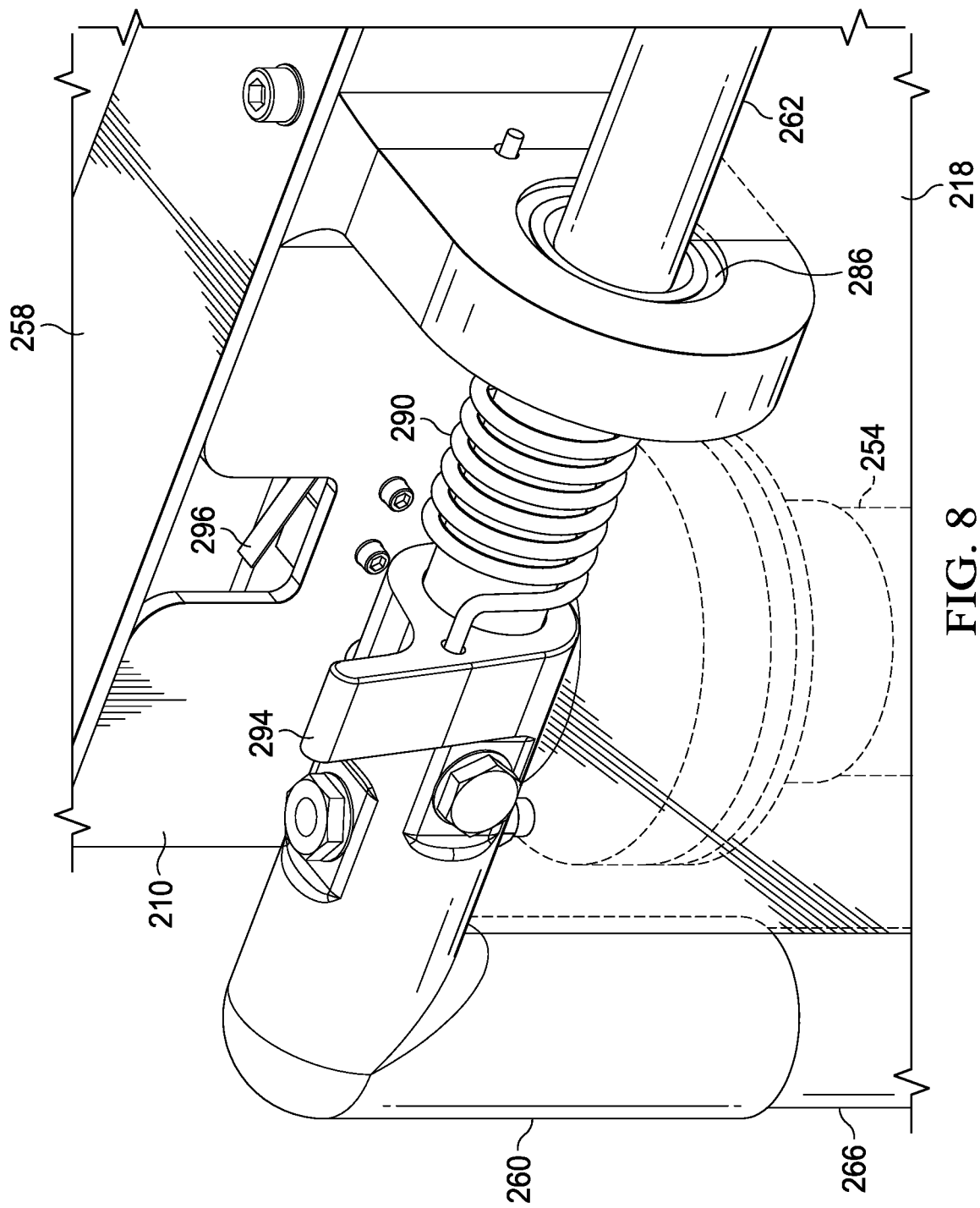
FIG. 8 is a detail view of an upper corner of the door of the thermal shroud of FIG. 3.
Figure 9:
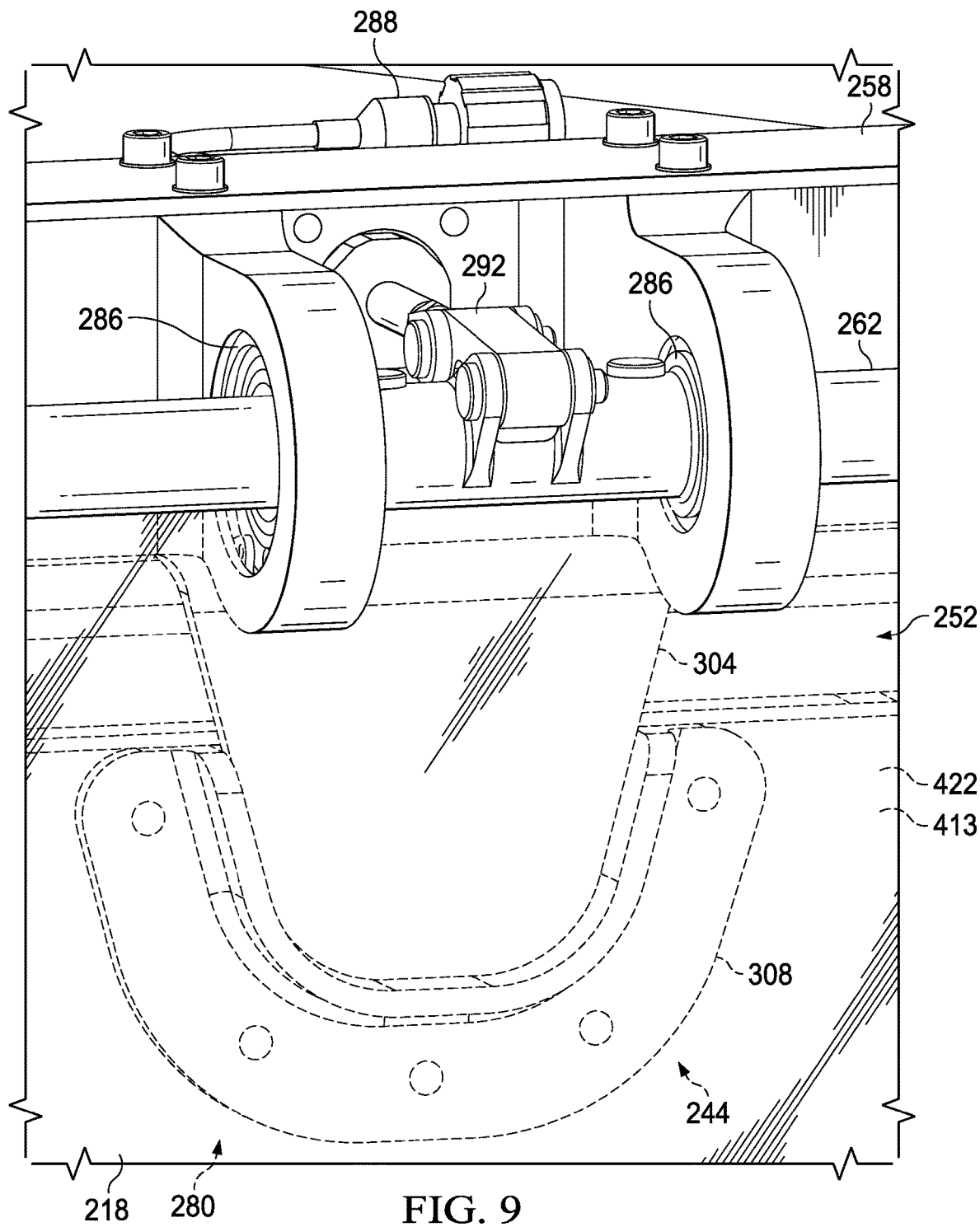
FIG. 9 is a detail view of the door actuator and upper tab of the thermal shroud and satellite assembly of FIG. 3.

As shown in FIGS. 8 and 9, hinge rod 262 is supported by a plurality of bearings 286 in housings mounted to upper lateral bar 258 of frame 210. Opening and closing of door 218 are effected by rotation of hinge rod 262 by a linear actuator 288 and a pair of torsion springs 290. Linear actuator 288 is disposed at an approximate center point of hinge rod 262, as shown in FIG. 9. Torsion springs 290 are disposed at left and right ends of the hinge rod, with the left spring shown in FIG. 8.

Linear actuator 288 is connected to hinge rod 262 by a linkage 292, which is configured to transform the linear motion of the actuator into rotational motion. The linear actuator may be connected to a control system of the launch vehicle to trigger opening of door 218. In the present example, linear actuator 288 is a paraffin actuator. In general, any effective light-weight linear or rotational actuator may be used.

Torsion springs 290 bias hinge rod 262 against the action of linear actuator 288 and linkage 292. That is, the torsion springs are configured to urge door 218 closed. Torsion springs 290 may also be described as providing a return force and/or holding the door closed. Linear actuator 288 may apply sufficient force to overcome the bias of torsion springs 290. In the present example, the pair of torsion springs apply a 5 inch-pound rotational force. In general, any strength of spring may be used, preferably of sufficient strength to maintain the door in the closed position during maneuvering of the launch vehicle.

Also mounted to hinge rod 262 are a pair of rotational stops 294, one of which is depicted in FIG. 8. Each rotational stop extends radially out from the hinge rod to engage a corresponding limit switch 296 in upper lateral bar 258. Rotational stops 294 may rotate with hinge rod 262 through a selected rotational range of door 218, engaging the limit switch at the end of the rotational range. Engagement between rotational stops 294 and limit switches 296 may both prevent further rotation of door 218 and generate an electrical signal to confirm that the door has reached the open position.

Figure 10:
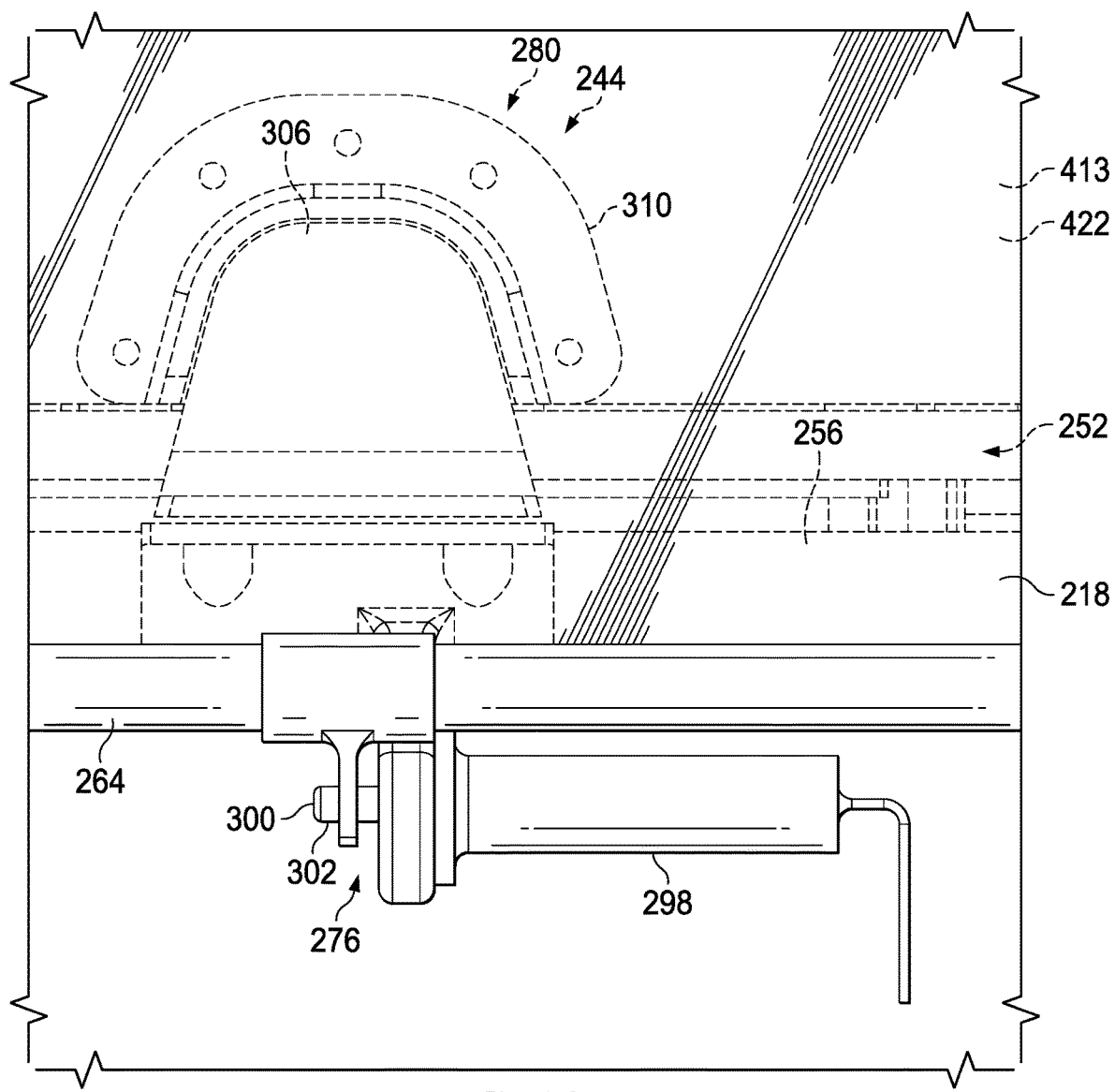
FIG. 10 is a detail view of the door release and lower tab of the thermal shroud and satellite assembly of FIG. 3.

FIG. 10 shows door latch 276. As discussed above, the door latch maintains door 218 in the closed position. More specifically, door latch 276 may keep the door closed throughout launch, until the shroud expands to the deployed position. Release of door latch 276 may permit opening of the door by the linear actuator.

Door latch 276 includes a pin puller 298 with a pin 300. The pin puller is mounted to lower lateral strut 256. Pin 300 engages an aperture 302 in a bracket mounted on latch rod 264 of door 218. Pin puller 298 may be low shock and fast-acting, to facilitate smooth and consisted release of 218.

Also shown in FIGS. 9 and 10 is restraint system 280. The system includes an upper tab 304 and a lower tab 306. The upper tab is mounted to upper lateral bar 258 and the lower tab is mounted to lower lateral strut 256. Each tab 304, 306 has a rounded trapezoidal shape and extends inward, over opening 252. Restraint system 280 further includes an upper receiving bracket 308 and a lower receiving bracket 310.

Both receiving brackets 308, 310 are mounted to an adjacent portion of distal satellite 413. Each bracket includes a flat mounting plate and a raised lip curved to match the corresponding tab 304, 306. The raised lip may be described as forming a recess to receive the tab. When a tab is received by the corresponding bracket, a flat inner surface of the tab may be close to but spaced from, or in contact with, the mounting plate of the bracket. An outer curved edge of the tab may be close to but spaced from the raised lip of the bracket.

In the present example, brackets 308, 310 are mounted to a wall panel 422 of the housing of distal satellite 413. Wall panel 422 may be described as a fore panel of the distal satellite, and is disposed proximate opening 252. In general, brackets 308, 310 may be mounted to any appropriate structure of an enclosed satellite or satellites that is proximate the opening.

Upper tab 304 and upper receiving bracket 308 may be described as an engaging structure. Similarly, lower tab 306 and lower receiving bracket 310 may be described as an engaging structure. In the present example, restraint system 280 includes two engaging structures. In general the system may include any number or disposition of engaging structures appropriate to desired restraint of the shroud.

When thermal shroud 200 is in stowed position 244 as shown in FIGS. 5, 9 and 10, each of tabs 304, 306 is received by the corresponding bracket 308, 310. The tabs 304, 306 may be described as engaging the brackets 308, 310 in stowed position 244. When the tabs engage the brackets, restraint system 280 may restrict both lateral and vertical motion of distal end 216 of thermal shroud 200. More specifically, contact between the tabs and the raised lips of the brackets may limit or prevent movement of frame 210 relative to satellites 412.

Constraining lateral movement of the distal end of thermal shroud 200 may stabilize the shroud through the intense forces and vibrational loading of launch. The distal end of the thermal shroud may also be described as supported by the satellites. Restraint system 280 may allow frame 210 to be less stiff, and correspondingly lighter weight.

When thermal shroud 200 expands to deployed position 248 as shown in FIGS. 6 and 7, tabs 304, 306 are withdrawn from brackets 308, 310. As vertical struts 254 expand, upper lateral bar 258 and lower lateral strut 256 move away from distal satellite 413. Upper tab 304 and lower tab 306 are therefore drawn away from wall panel 422 and brackets 308, 310. The tabs are drawn clear of wall panel 422, such that deployment of satellites 412 is not obstructed by restraint system 280. Constraint of lateral movement of the distal end of the shroud is also released.

Figure 11:
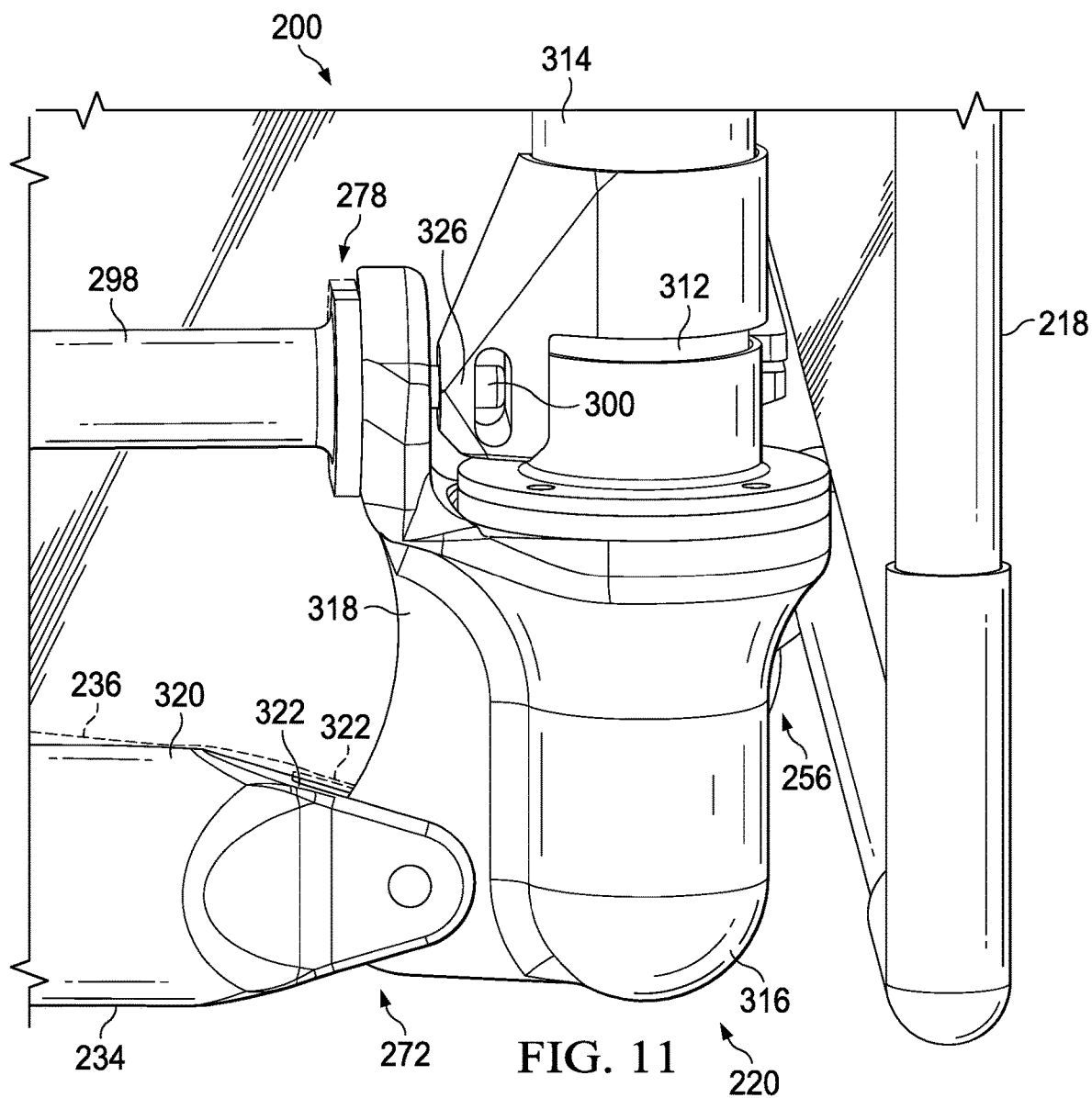
FIG. 11 is a detail view of the detail view of an expansion release and pivotable corner bracket of the thermal shroud of FIG. 3.

FIG. 11 is a detail view of one of pivotable corner brackets 272, specifically the bracket connecting a longitudinal strut 234, lower lateral strut 256, and a left-hand one of vertical struts 254. Corner bracket 272 fixedly connects the lower lateral strut and a lower member 312 of the vertical strut. The corner bracket pivotably connects the lower lateral strut and the vertical strut to longitudinal strut 234.

Corner bracket 272 includes an elbow-shaped sleeve portion 316, which surrounds a lateral end of lower lateral strut 256 and is fastened to a bottom end of lower member 312. A curved flange 318 extends longitudinally from sleeve portion 316, toward longitudinal strut 234. Corner bracket 272 further includes a bifurcated sleeve portion 320 which surrounds an end of longitudinal strut 234 and an end of cross-brace 236. Sleeve portion 320 includes two fingers 322, which extend either side of flange 318. Together fingers 322, flange 318, and a bolt extending laterally through the two components may form a pivotable connection.

In the present example, corner bracket 272 is additively manufactured. More specifically, the bracket is produced by direct metal laser sintering (DMLS) of an aluminum alloy.

Additive manufacture of the corner bracket and other such components of thermal shroud 200 may allow the complex geometry to be rapidly and inexpensively produced. Such geometry may enable the desired structural connection and functional movement with minimal material. In general, any effective method of manufacture may be used.

Also shown in FIG. 11 is one of expansion latches 278. Vertical strut 254 and expansion latch 278 at left side 220 of the thermal shroud are depicted in FIGS. 11-13 and described below, but the vertical strut and expansion latch at the right side of the thermal shroud may be understood to be correspondingly configured. Release of the two expansion latches may be coordinated by a control system of the launch vehicle, to achieve symmetrical expansion of the thermal shroud.

Expansion latch 278 includes a pin puller 298 as in door latch 276 (FIG. 10). Pin 300 of the pin puller engages an aperture of a bracket 326 fixed to an upper member 314 of vertical strut 254. Pin puller 298 is mounted to sleeve portion 316 of corner bracket 272, and fixed relative to lower member 312 of the vertical strut. Engagement of pin 300 with bracket 326 therefore fixes upper member 314 relative to lower member 312, preventing expansion of vertical strut 254.

Upper member 314 and lower member 312 of vertical strut 254 are shown more clearly in FIGS. 12 and 13. In FIG. 12, the vertical strut is shown in collapsed position 282. In FIG. 13, vertical strut 254 is shown in expanded position 284. In collapsed position 282 a majority of lower member 312 is received in upper member 314, while in expanded position 284 only an upper portion of the lower member is received in the upper member.

Relative motion of upper member 314 and lower member 312 is driven by a fluid damped passive actuator 328. The actuator may exert a bias at all times, but expansion of vertical strut 254 may be triggered by release of the expansion latch. A driving rod 330 is disposed inside upper member 314 and lower member 312, with a first end of the rod fixed at a top end of upper member 314, proximate upper lateral bar 258. A second end 331 of driving rod 330 is fixed to a spring 332 at a bottom end of lower member 312. The spring urges driving rod 330 upward, away from lower lateral strut 256, causing upper member 314 and lower member 312 to telescope and resulting in expansion of vertical strut 254.

Spring 332 and the attached second end 331 of driving rod 330 are enclosed in a damper housing 334 filled with a fluid 336. Second end 331 and damper housing 334 may be described as acting as a piston and cylinder. The second end fully obstructs an interior passage of damper housing 334, but includes orifices to permit passage of fluid 336. The orifices may be precisely sized to control the rate of expansion of vertical strut 254. Such controlled expansion may provide smooth, low-shock deployment of the thermal shroud.

Second end 331 further includes a check valve for controlled compression of actuator 328. Vertical strut 254 may be manually collapsed from expanded position 284 to collapsed position 282 by a technician or other user during satellite loading and launch preparation. The check valve may regulate a rate at which the vertical strut collapses, to prevent shocks or damage from overly rapid collapse of the thermal shroud.

An upper end of damper housing 334 includes redundant O-ring seals to prevent leakage of fluid 336 even when the thermal shroud is subjected to the extreme temperatures, pressure changes, and vibrations associated with launch and a space environment. In the present example, fluid 336 is a silicone oil. In general, the fluid may be selected according to desired damping properties. A spring coefficient of spring 332, number and size of orifices of second end 331, and an interior diameter of damper housing 334 may be selected to achieve a desired rate of expansion of vertical strut 254.

In the present example, vertical strut 254 expands by approximately 6 inches. This results in 3 inches of clearance at the upper and lower edges of satellites 412, as shown in FIGS. 6 and 7. Satellites 412 are each approximately 20 inches square, so an expansion of 6 inches results in a volume increase of around 15%. Without the expansion of thermal shroud 200, satellites 412 would need to be smaller by a corresponding amount. In other words, thermal shroud 200 enables design of a larger satellite for a given available volume in the launch vehicle, rather than needing to allow for a separate shroud and dynamic clearance. In the present example, thermal shroud 200 allows approximately 15% larger satellites.

Figure 14:
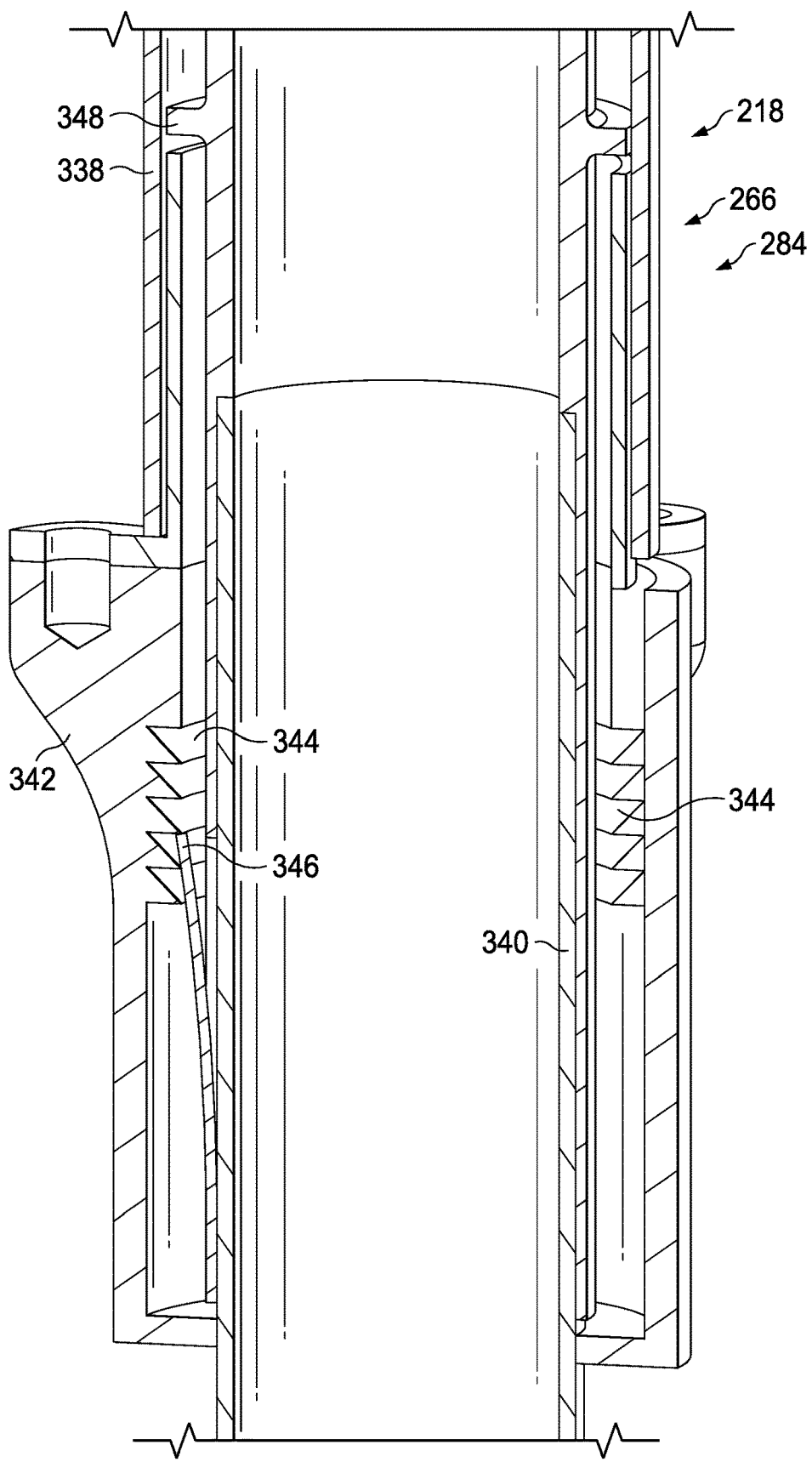
FIG. 14 is a cross-sectional detail view of the ratchet lock of a side strut of the door of the thermal shroud of FIG. 3.

FIG. 14 is a cross-sectional view of one of side struts 266 of door 218, in expanded position 284. The other side strut may be understood to be correspondingly configured. Side strut 266 includes an outer member 338 partially enclosing an inner member 340. As shown in FIG. 5, outer member 338 is fixed to hinge rod 262 and inner member 340 is fixed to latch rod 264. The two members may slide freely relative one another, and side strut 266 may expand as the hinge rod and latch rod are pulled apart by expansion of vertical struts 254. That is, expansion of side strut 266 may be driven by expansion of expansion of vertical struts 254.

Referring again to FIG. 14, a lock bracket 342 is disposed on side strut 266 where inner member 340 is received into outer member 338. An upper portion of the bracket is received between the inner and outer members, and a lower portion of the bracket surrounds inner member 340. Lock bracket 342 includes saw-teeth 344 on an inner surface, proximate inner member 340. In the present example, the saw-teeth are divided into three circumferential sections, divided by three sections of smooth surface.

Inner member 340 includes corresponding flexible tabs 346. In the present example, the inner member includes three flexible tabs corresponding to the three saw-tooth sections of lock bracket 342. As side strut 266 expands, flexible tabs 346 may slide over saw-teeth 344. The flexible tabs may then prevent return motion of inner member 340 relative to lock bracket 342, thereby preventing collapse of side strut 266. Such locking of side strut 266 may avoid collapse of door 218 as the door opens to open position 250 (FIG. 7)

For manual collapse of side strut 266, the lower portion of lock bracket 342 may be rotatable. A user may rotate the lower portion of the bracket by about 60 degrees, such that flexible tabs 346 engage the smooth surfaces between portions of saw-teeth 344. Return motion of inner member 340 and collapse of side strut 266 may then be possible. Rotating back the lower portion of the bracket may prepare the side strut for expansion.

Inner member 340 further includes a stop flange 348 extending radially out from the inner member. Contact between flange 348 and an uppermost edge of lock bracket 342 may prevent further motion of inner member 340 and expansion of side strut 266. That is, flange 348 may limit expansion of the side strut.

C. Illustrative Method

Figure 15:
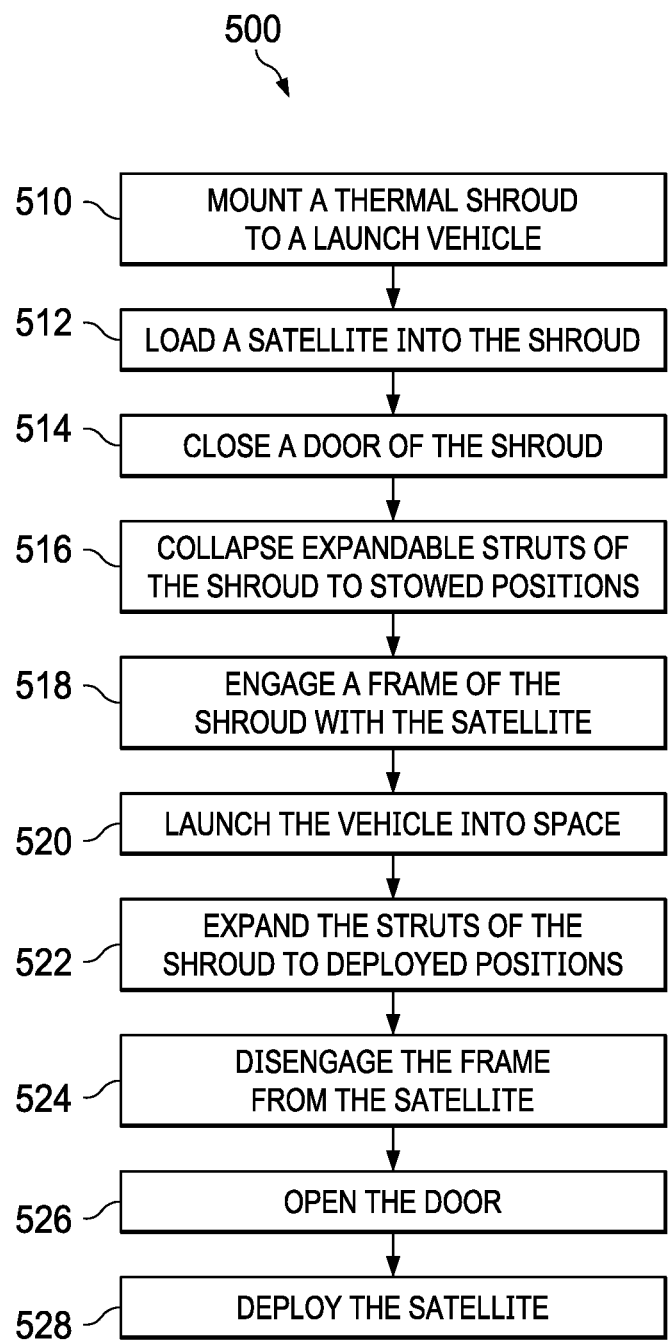
FIG. 15 is a flow chart depicting steps of an illustrative method of transporting a satellite to space according to the present teachings.

This section describes steps of an illustrative method for transport a satellite to space; see FIG. 15. Aspects of thermal enclosures described above may be utilized in the method steps described below. Where appropriate, reference may be made to components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. Although various steps of method 500 are described below and depicted in FIG. 15, the steps need not necessarily all be performed, and in some cases may be performed simultaneously or in a different order than the order shown.

At step 510, the method includes mounting a thermal shroud to a launch vehicle. The shroud may include a rigid frame and a flexible thermally insulating material. For example, the shroud may include a plurality of hollow composite tubes connected by additively manufactured brackets and a thermal blanket material comprising a foil layer deposited on thin, flexible plastic sheeting.

Mounting the shroud may include bolting and/or otherwise fastening, bonding, or attaching a base portion of the shroud to a payload adaptor of the launch vehicle, to a mounting plate, and/or to a satellite assembly. For example, step 510 may include fastening a base plate of the shroud to a mounting plate bolted to a ring-shape secondary payload adaptor such that a longitudinal axis of the shroud extends radially outward from the ring.

Step 512 includes loading a satellite into the shroud. Loading the satellite may include inserting the satellite through an opening of the shroud and mounting the satellite to a support structure. The satellite may be mounted to the base portion of the shroud, to a mounting plate, and/or to the payload adaptor of the launch vehicle. In some examples, loading the satellite into the shroud may including enclosing a satellite or satellite assembly already mounted to the launch vehicle with the shroud.

In some examples, step 512 may include loading multiple satellites into the shroud. In such examples, the satellites may be mounted sequentially. One or more loaded satellites may be indirectly mounted to the support structure through another satellite or satellites. Preparation of the satellite or satellites for launch may be conducted and/or concluded before proceeding with the method, the next steps of which may limit further physical access to the satellites.

Step 514 includes closing a door of the shroud. Closing the door may include allowing a bias spring to induce rotation of the door about a hinge or hinge member, such that the door obscures the opening through which the satellites were inserted. The step may further include securing or latching the door in a closed position. For example, the pin of a low-shock pin puller may be engaged with a latch of the door.

Step 516 includes collapsing expandable struts of the shroud to stowed positions. The rigid frame and the door of the shroud may include a plurality of telescoping members acting as expandable struts and permitting expansion and collapse of the shroud along at least one axis. For example, the shroud may be expandable along an axis parallel to a launch axis of the launch vehicle. Collapsing the expandable struts may include engage one or more latches to retain the struts in the stowed positions.

Two or more of the telescoping members may include an actuator to drive expansion of the shroud. Step 516 may include compression, de-activation, and/or reversal of the actuators. For example, the step may include collapsing a fluid damped passive spring actuator. In such an example, collapse of the actuator may be regulated by a check valve to limit the rate of collapse. Step 516 may be performed manually, by a user or such as a payload specialist of a launch.

Step 518 includes engaging a frame of the shroud with the satellite. The frame and shroud may include corresponding structures configured to engage as the expandable struts are collapsed in step 516. For example, tabs may be fixed to upper and lower members framing the opening of the shroud. Recesses or brackets on a loaded satellite proximate the opening may receive the tabs as the shroud is collapsed. Engagement between the frame and the satellite may limit or prevent lateral motion of the thermal shroud.

Step 520 includes launching the vehicle into space. Launching the vehicle may include carrying the thermal shroud and the loaded satellites into space. The step may further include positioning the launch vehicle for deployment of one or more of the satellites. For example, positioning the launch vehicle may include placing the vehicle in a desired orbit for the satellite.

At step 522, the method includes expanding the expandable struts of the shroud to deployed positions. Expanding the struts may include releasing the one or more latches engaged in step 516 to permit expansion. Expanding the struts may further include engaging or initiating active actuators, or allowing action by passive actuators. For example, the step may include allowing the spring bias of a fluid damped passive spring actuator to expand two of the struts at a controlled rate. Expandable struts not including actuators may expand in response to actuated struts. In some examples, expanding the struts may include engaging a ratchet lock of one or more of the expandable struts, to prevent collapse back to the stowed position.

Step 524 includes disengaging the frame from the satellite. Expansion of the expandable struts may disengage the corresponding structures on the frame and satellite. For example, the tabs fixed to upper and lower members may be withdrawn from the recess or brackets on the proximate satellite as the members expand away from the satellite. Disengaging the frame from the satellite may leave a clear and unobstructed path through the opening for the satellite.

At step 526 the method includes opening the door. Opening the door may include releasing a latch engaged in step 514. The door may be opened using an actuator. For example, a paraffin linear actuator connected to a hinge member of the door by a linkage may rotate the hinge member to open the door. The door may be opened by at least 90 degrees, preferably 100 or more degrees to provide a clear exit for the loaded satellite or satellites.

Step 528 includes deploying the satellite or satellites. Deployment may include actuating a separation system to provide a separating impulse out of the opening of the shroud and away from the launch vehicle. In examples where multiple satellites are loaded in the shroud, satellites may be deployed sequentially. In such examples, the method may include repeating step 514 to close the door, maneuvering the launch vehicle for deployment of an additional satellite, and repeating step 526 to open the door again before deploying the next satellite.

Illustrative Combinations and Additional Examples

This section describes additional aspects and features of thermal enclosures, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A satellite assembly, comprising:
a first satellite stowed in a launch vehicle,
a first shroud including a frame supporting a flexible thermal blanket enclosing the first satellite.

A1. The satellite assembly of A0, wherein the first satellite and the first shroud are each connected to a ring structure, the ring structure having a central axis parallel to a launch axis of the launch vehicle.

A2. The satellite assembly of A1, further comprising a second shroud enclosing a second satellite, the first and second shrouds being connected to opposite sides of the ring structure.

A3. The satellite assembly of A2, wherein each of the first and second shrouds contains plural satellites stacked perpendicular to the launch axis.

A4. The satellite assembly of any of A0-A3, wherein the first satellite and the first shroud are independently supported by the ring structure.

A5. The satellite assembly of any of A0-A4, further comprising:
a second satellite, wherein the first and second satellites are enclosed by the thermal blanket.

A6. The satellite assembly of A5, wherein the first and second satellites are stacked perpendicular to a launch axis of the launch vehicle.

A7. The satellite assembly of any of A0-A6, wherein the first shroud has a proximal end portion and a distal end portion, the distal end portion being expandable.

A8. The satellite assembly of A7, wherein the distal end portion is expandable only in a direction parallel with a launch axis of the launch vehicle.

A9. The satellite assembly of A7 or A8, wherein the distal end portion of the enclosure includes a door that expands and opens when deploying the first satellite.

A10. The satellite assembly of A9, wherein the door is configured to close after the satellite is deployed.

A11. The satellite assembly of any of A7-A10, wherein the distal end portion includes a pivotable corner bracket.

A12. The satellite assembly of any of A0-A11, wherein the first shroud has trapezoidal sides.

A13. The satellite assembly of any of A0-A12, wherein the first shroud is wedge shaped.

A14. The satellite assembly of any of A0-A13, wherein the frame includes telescoping side supports to permit expansion of the enclosure when deploying the first satellite.

A15. The satellite assembly of any of A0-A14, wherein the first shroud has a stowed position and a deployed position, the first satellite constraining lateral movement of the first shroud when the first shroud is in the stowed position, and releasing lateral constraint when the first shroud expands into the deployed position A16. The satellite assembly of any of A0-A15, the first shroud having a proximal end portion and a distal end portion, the distal end portion having a door covering an opening framed by top and bottom frame elements and two side frame elements, the side frame elements being capable of telescoping between a stowed position and a deployed position for expanding the size of the opening.

A17. The satellite assembly of A16, wherein the first satellite engages at least one of the top and bottom frame elements, constraining lateral movement of the first shroud, when the side frame elements are in the stowed position.

A18. The satellite assembly of A17, wherein the first satellite disengages the at least one of the top and bottom frame elements when the side frame elements are in the deployed position.

A19. The satellite assembly of any of A0-A18, wherein the shroud is supported by a satellite assembly including the first satellite.

B0. An apparatus for transporting a satellite to space, comprising:
a launch vehicle,
a thermal shroud including a frame and a flexible wall material supported by the frame, the shroud being connected to the launch vehicle and configured for housing a satellite during a launch phase.

B1. The apparatus of B0, wherein the shroud is configured to house a plurality of stacked satellites.

B2. The apparatus of B1, further comprising a ring structure connected to the launch vehicle, the ring structure having a central axis parallel to a launch axis of the launch vehicle, wherein the shroud is mounted on the ring structure.

B3. The apparatus of B2, wherein the shroud has a long axis perpendicular to the launch axis.

B4. The apparatus of any of B0-B3, wherein the shroud is wedge shaped.

B5. The apparatus of any of B0-B4, wherein the shroud has a proximal end portion and a distal end portion, the distal end portion being expandable.

B6. The apparatus of B5, wherein the distal end portion is expandable only in a vertical direction parallel to the launch axis.

B7. The apparatus of B5 or B6, wherein the distal end portion of the shroud includes an expandable door.

B6. The apparatus of any of B5-B7, wherein the frame has a distal frame portion at the distal end portion of the shroud, wherein the distal frame portion has opposing side struts connected to a top strut and a bottom strut, each side strut being capable of telescoping between a stowed position and a deployed position.

B7. The apparatus of B6, wherein the distal end portion of the shroud has a door pivotally connected to one of the top and bottom struts and configured to move between open and closed positions.

B8. The apparatus of B7, wherein the door has a pair side struts configured to telescope to an expanded position in parallel with the side struts of the distal frame portion as the side struts of the distal frame portion move to the deployed position.

C0. An assembly for transporting satellites to space, comprising:
a ring structure having a central axis parallel to a launch direction,
a plurality of shrouds extending radially outward from the ring structure, each shroud including a frame supporting a flexible wall material, having a proximal end connected to the ring structure, and having a distal end including a door for permitting deployment of a satellite into space.

C1. The assembly of C0, wherein the distal end of each shroud is expandable from a stowed configuration to a deployed configuration.

C2. The assembly of C1, wherein the distal end of each shroud is expandable only in a vertical direction parallel to the launch direction.

C3. The assembly of any of C0-C2, wherein each shroud has a top side, a bottom side, and a pair of lateral sides, wherein each of the top side, bottom side, and proximal end maintain a constant area while each of the pair of lateral sides and the distal end expand.

C4. The assembly of any of C0-C3, wherein the distal end of each shroud has a rectangular opening framed by a top strut, a bottom strut, and a pair of opposing side struts, each side strut including a spring for urging the distal end to expand into a deployed configuration.

C5. The assembly of C4, wherein the door has a pair of opposing frame members, each frame member being capable of telescoping in parallel with the pair of opposing side struts.

C6. The assembly of C4 or C5, wherein each shroud has an engaging structure mounted to one or both of the top strut and the bottom strut for constraining movement of the respective shroud relative to an enclosed satellite when the shroud is in the stowed position.

C7. The assembly of C6, wherein the engaging structure disengages from a satellite when the respective shroud expands to the deployed position.

C8. The assembly of C6 or C7, wherein the engaging structure includes a trapezoidal tab and a complementary recess configured to receive the tab.

D0. A method of thermally insulating a satellite during launch, comprising:
mounting a thermal shroud including a frame supporting a flexible thermal blanket to a payload adaptor of a launch vehicle,
loading a satellite into the shroud through an opening in the shroud,
closing a door of the shroud to cover the opening,
transporting the satellite into space in the launch vehicle,
opening the door of the shroud, and
deploying the satellite through the opening.

D1. The method of D0, further including engaging a frame of the shroud with the satellite.

D2. The method of D0 or D1, further including expanding the opening of the shroud prior to deploying the satellite.

D3. The method of any of D0-D2, wherein mounting the thermal shroud to the payload adaptor includes fastening the frame of the shroud to a support structure fixed to the payload adaptor.

D4. The method of D3, wherein loading the satellite includes mounting the satellite to the support structure with a separation system.

D5. The method of any of D0-D4, further including loading an additional satellite into the shroud through the opening, and mounting the additional satellite to the satellite with a separation system.

Advantages, Features, and Benefits

The different examples of the expandable thermal enclosure described herein provide several advantages over known solutions for thermal protection of satellites during launch. For example, illustrative examples described herein allow use of lightweight thermally insulating materials.

Additionally, and among other benefits, illustrative examples described herein maximize available interior volume.

Additionally, and among other benefits, illustrative examples described herein enable larger satellites for a given available volume in the launch vehicle.

Additionally, and among other benefits, illustrative examples described herein allow protection of multiple connected satellites.

Additionally, and among other benefits, illustrative examples described herein allow distal support and stabilization from the satellites.

Additionally, and among other benefits, illustrative examples described herein allow controlled, low shock expansion.

No known system or device can perform these functions, particularly for satellites mounted to a secondary payload adaptor. Thus, the illustrative examples described herein are particularly useful for microsatellites. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A satellite assembly, comprising:
a satellite stowed in a launch vehicle,
a shroud including a frame supporting a flexible thermal blanket enclosing the satellite,
wherein the shroud includes a distal end portion having a door covering an expandable opening, and the distal end portion includes a frame element of the frame of the shroud, the frame element being capable of telescoping between a stowed position and a deployed position.

2. The satellite assembly of claim 1, wherein the door expands and opens when deploying the satellite.

3. The satellite assembly of claim 2, wherein the door is configured to close after the satellite is deployed.

4. The satellite assembly of claim 1, wherein the shroud has trapezoidal sides.

5. The satellite assembly of claim 1, wherein the shroud has a stowed position and a deployed position, the satellite constraining lateral movement of the shroud when the shroud is in the stowed position, and releasing lateral constraint when the shroud expands into the deployed position.

6. The satellite assembly of claim 1, wherein the opening is framed by a top frame element, a bottom frame element, and two side frame elements, the side frame elements being capable of telescoping between a stowed position and a deployed position for expanding the size of the opening.

7. The satellite assembly of claim 6, wherein the satellite engages at least one of the top and bottom frame elements, constraining lateral movement of the shroud, when the side frame elements are in the stowed position.

8. An assembly for transporting satellites to space, comprising:
- a ring structure having a central axis parallel to a launch direction,
- a plurality of shrouds extending radially outward from the ring structure, each shroud including a frame supporting a flexible wall material, having a proximal end connected to the ring structure, and having a distal end opposing the proximal end along a longitudinal axis of the shroud,
- wherein the distal end of each shroud includes a door for permitting deployment of a satellite radially outward into space, and the longitudinal axis of each shroud is perpendicular to the central axis of the ring structure, and
- wherein each shroud has a top side, a bottom side, and a pair of lateral sides, wherein each of the top side, the bottom side, and the proximal end maintain a constant area while each of the pair of lateral sides and the distal end expand.

9. The assembly of claim 8, wherein the distal end of each shroud is expandable from a stowed configuration to a deployed configuration.

10. The assembly of claim 9, wherein the distal end of each shroud is expandable only in a direction parallel to the launch direction.

11. The assembly of claim 8, wherein the distal end of each shroud has a rectangular opening framed by a top strut, a bottom strut, and a pair of opposing side struts, each side strut including a spring for urging the distal end to expand into a deployed configuration.

12. The assembly of claim 11, wherein the door has a pair of opposing frame members, each frame member being capable of telescoping in parallel with the pair of opposing side struts.

13. The assembly of claim 8, wherein the distal end of each shroud includes a frame element of the frame of the shroud, the frame element being capable of telescoping between a stowed position and a deployed position.

14. The satellite assembly of claim 1, wherein the shroud is configured to house a plurality of stacked satellites.

15. The satellite assembly of claim 1, wherein the distal end portion of the shroud is expandable only in a direction parallel to a launch axis of the launch vehicle.

16. The satellite assembly of claim 1, wherein the shroud has a top side, a bottom side, and a pair of lateral sides, wherein each of the top side and the bottom side maintain a constant area while each of the pair of lateral sides and the distal end portion expand.

17. The satellite assembly of claim 1, further including a ring structure having a central axis parallel to a launch direction, wherein the shroud is one of a plurality of shrouds extending radially outward from the ring structure.

18. The assembly of claim 8, wherein the door of each shroud expands and opens when deploying the satellite.

19. The assembly of claim 8, wherein the top and bottom sides of each shroud are trapezoidal.

20. The assembly of claim 8, wherein the flexible wall material of each shroud is a thermal blanket.

* * * * *